(12) United States Patent
Nasti et al.

(10) Patent No.: US 11,612,810 B2
(45) Date of Patent: *Mar. 28, 2023

(54) ELECTRONIC DEVICE WITH REVERSIBLE RAILED ATTACHMENT CONNECTOR SYSTEM

(71) Applicant: Motorola Mobility LLC, Chicago, IL (US)

(72) Inventors: Joseph Nasti, Chicago, IL (US); Nigil Valikodath, Elmhurst, IL (US); George Standish, Marengo, IL (US)

(73) Assignee: Motorola Mobility LLC, Chicago, IL (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/205,934

(22) Filed: Mar. 18, 2021

(65) Prior Publication Data

US 2021/0205700 A1    Jul. 8, 2021

Related U.S. Application Data

(63) Continuation of application No. 16/357,005, filed on Mar. 18, 2019, now Pat. No. 10,953,320.

(51) Int. Cl.
*A63F 13/24*    (2014.01)
*G06F 1/16*    (2006.01)
*A63F 13/92*    (2014.01)

(52) U.S. Cl.
CPC ............ *A63F 13/24* (2014.09); *G06F 1/1624* (2013.01); *A63F 13/92* (2014.09)

(58) Field of Classification Search
None
See application file for complete search history.

(56) References Cited

U.S. PATENT DOCUMENTS

| | | | | |
|---|---|---|---|---|
| 5,852,545 A | * | 12/1998 | Pan-Ratzlaff | ......... H04R 1/025 381/300 |
| 6,151,206 A | * | 11/2000 | Kato | ..................... G06F 1/1688 381/87 |
| 6,392,871 B1 | * | 5/2002 | Yanase | ................... G06F 1/162 345/905 |
| 6,567,677 B1 | | 5/2003 | Sokoloff | |

(Continued)

OTHER PUBLICATIONS

Cunningham, Xanthia C., "Non-Final Office Action", U.S. Appl. No. 16/357,005, filed Mar. 18, 2019; dated Aug. 21, 2020.

*Primary Examiner* — Xanthia C Cunningham
(74) *Attorney, Agent, or Firm* — Philip H. Burrus, IV

(57) ABSTRACT

An electronic device includes a device housing. A monorail having a monorail body defining a first end and a second end separated from the first end along a major axis of the monorail body is mechanically coupled to a minor face of the device housing by a bridge member. A first electrical connector is positioned at the first end of the monorail body, while a second electrical connector positioned at the second end of the monorail body. The first electrical connector and the second electrical connector are of the same type. An attachment having a housing defining a monorail receiver with an aperture at a first end and a bounding wall at a second end includes an electrical connector situated within the monorail receiver at the bounding wall. The attachment can be coupled in two configurations to the monorail.

20 Claims, 14 Drawing Sheets

(56) References Cited

U.S. PATENT DOCUMENTS

| | | | |
|---|---|---|---|
| 6,728,557 B1 * | 4/2004 | Tracy | G06F 1/1637 439/31 |
| 6,788,285 B2 * | 9/2004 | Paolucci | G06F 1/1632 341/20 |
| 7,149,557 B2 | 12/2006 | Chadha | |
| 7,374,425 B1 | 5/2008 | Kuo et al. | |
| 7,539,526 B2 | 5/2009 | Pirila et al. | |
| 7,667,146 B2 | 2/2010 | Eckadt | |
| 7,791,877 B2 * | 9/2010 | Shyu | G06F 1/1616 361/679.55 |
| 8,345,429 B2 | 1/2013 | Kim et al. | |
| 8,553,397 B2 | 10/2013 | Alameh et al. | |
| 8,681,113 B1 * | 3/2014 | Wu | G06F 1/166 345/173 |
| 8,947,871 B2 | 2/2015 | Lin | |
| 9,300,774 B2 | 3/2016 | Oh | |
| 9,898,048 B2 | 2/2018 | Szeto | |
| 10,020,625 B2 | 7/2018 | Tsai et al. | |
| 2008/0186663 A1 | 8/2008 | Chen | |
| 2009/0147468 A1 * | 6/2009 | Shyu | G06F 1/1616 361/679.55 |
| 2009/0190295 A1 * | 7/2009 | Chin | G06F 1/1618 361/679.55 |
| 2010/0277859 A1 * | 11/2010 | Wang | H04M 1/0247 361/679.21 |
| 2011/0128678 A1 * | 6/2011 | Cheng | G06F 1/1684 361/679.01 |
| 2012/0182227 A1 * | 7/2012 | Wu | G06F 1/1601 345/173 |
| 2012/0252230 A1 * | 10/2012 | Alameh | H04M 1/0256 439/31 |
| 2012/0275089 A1 * | 11/2012 | Alameh | G06F 1/1647 361/679.01 |
| 2013/0148282 A1 * | 6/2013 | Chen | G06F 1/1607 361/679.08 |
| 2018/0151982 A1 | 5/2018 | Hirose et al. | |
| 2018/0193731 A1 | 7/2018 | Oizumi et al. | |
| 2018/0193740 A1 | 7/2018 | Oizumi et al. | |
| 2018/0200620 A1 | 7/2018 | Yamashita et al. | |
| 2018/0311576 A1 | 11/2018 | Iwao et al. | |
| 2019/0196553 A1 * | 6/2019 | Lee | G06F 1/1616 |

* cited by examiner

ELECTRONIC DEVICE WITH REVERSIBLE RAILED ATTACHMENT CONNECTOR SYSTEM

CROSS REFERENCE TO PRIOR APPLICATIONS

This application is a continuation application claiming priority and benefit under 35 U.S.C. § 120 from U.S. application Ser. No. 16/357,005, filed Mar. 18, 2019, which is incorporated by reference for all purposes.

BACKGROUND

Technical Field

This disclosure relates generally to electronic devices, and more particularly to electronic devices having connectors.

Background Art

Modern portable electronic communication devices pack powerful computing power into very small packages. Illustrating by example, a modern smartphone has more computing power than even the most powerful desktop computer of only a few years ago.

As the computing power in these devices has increased, so too has their feature set. While mobile phones used to be only for making voice calls, today they are used to monitor health and wellness records, transact with social media, make financial transactions, maintain calendars, surf the web, and more.

This increased functionality can create issues for designers of these devices. For instance, it can be challenging to optimally locate displays, loudspeakers, microphones, and other user interface components for optimal performance in all conditions. It would be advantageous to have an improved electronic device that could be reconfigured with different features for different situations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
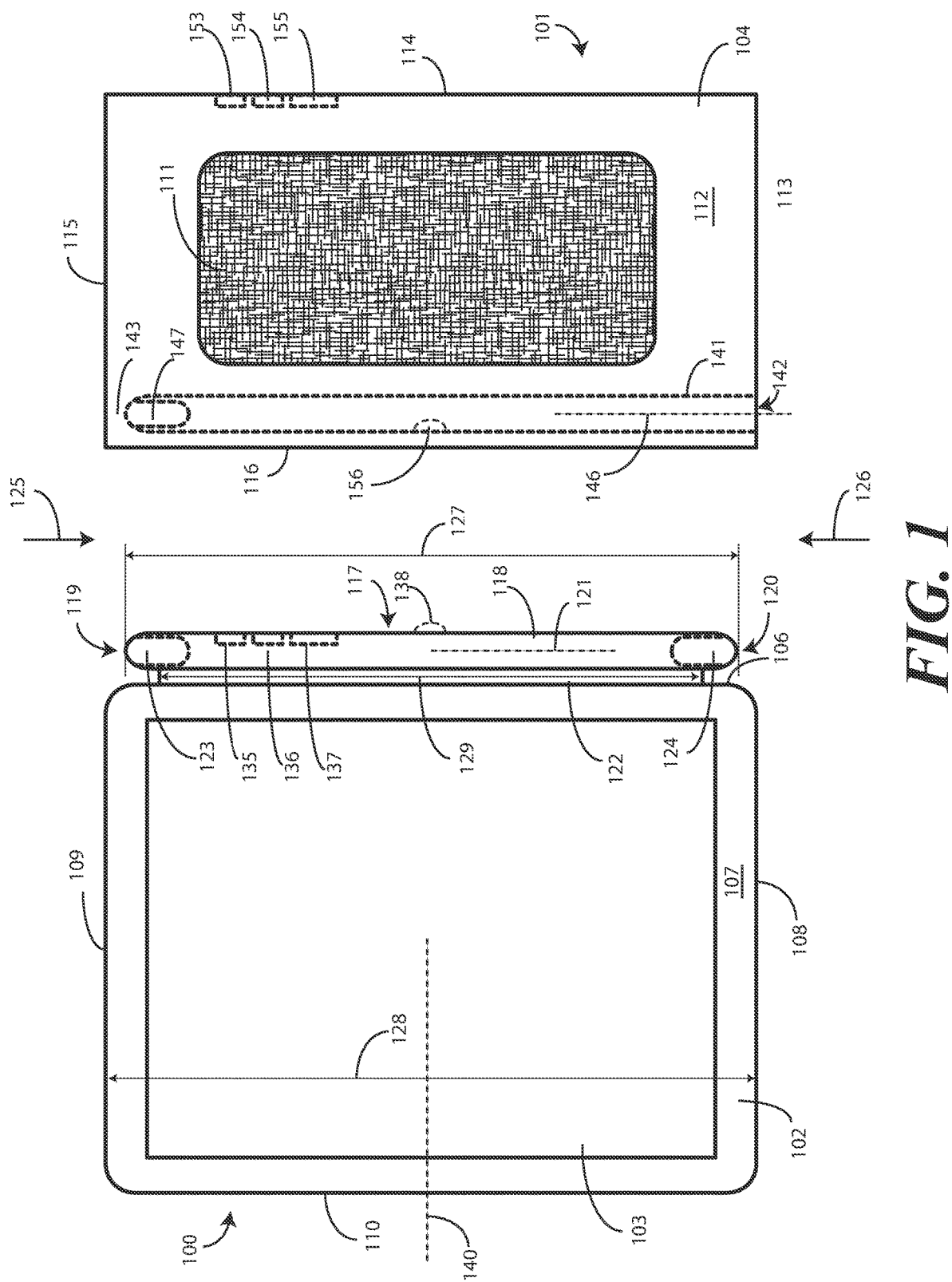
FIG. 1 illustrates a front elevation view of one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled"

as used herein is defined as connected, although not necessarily directly and not necessarily mechanically.

Also, reference designators shown herein in parenthesis indicate components shown in a figure other than the one in discussion. For example, talking about a device (10) while discussing figure A would refer to an element, 10, shown in figure other than figure A. Further, it is expected that one of ordinary skill, notwithstanding possibly significant effort and many design choices motivated by, for example, available time, current technology, and economic considerations, when guided by the concepts and principles disclosed herein will be readily capable of electronic devices, modular systems, and attachments in accordance with embodiments of the disclosure with minimal experimentation.

Embodiments of the disclosure contemplate that the increased functionality of modern portable electronic devices can create issues for designers, in that it can be challenging to optimally locate user interface components such as displays, loudspeakers, microphones, and imagers. Illustrating by example, people generally desire large, expansive displays defining a major face of an electronic device. This desire creates issues, as it leaves little room for other components such as loudspeakers, microphones, and other input and output components on the same side of the device. Additionally, people sometimes want to carry only a small device with basic functionality. At other times they prefer to use a larger, full-featured device.

Placement of accessory devices, such as loudspeakers and microphones, on the rear side of a device can sometimes be problematic. This could be true, for example, when a thin, flat, electronic device has a loudspeaker on its rear surface and is lying flat on a table. Output of that loudspeaker may be sub-optimal due to the acoustic interference occurring between the device housing and the table. However, at other times it may be desirable to have a loudspeaker on the rear side of the device. If a person is capturing video with a rear-facing camera of a person dancing, for instance, it may be not only desirable, but also actually preferable to have the loudspeaker on the rear surface of the electronic device so the person dancing can hear the music.

Embodiments of the disclosure advantageously provide a solution to this issue by providing a system that includes an electronic device having a monorail mechanical connector with electrical connectors situated at each end of the monorail mechanical connector. The symmetry of the monorail mechanical connector, which has electrical connectors of the same type at each end in one or more embodiments, allows an electronic device accessory, configured as an electronic device attachment, to be reversibly connected to the monorail mechanical connector such that the front side of the attachment faces in a first direction when the attachment is coupled to the monorail mechanical connector by sliding the attachment along the monorail mechanical connector from a first direction, with that same front side facing a second direction when the attachment is coupled to the monorail mechanical connector by sliding the attachment along the monorail mechanical connector from a second direction. Advantageously, if the front side of the attachment includes a loudspeaker, attaching the attachment to the electronic device in a first configuration allows the loudspeaker to be on the front side of the assembly, while attaching the attachment to the electronic device in a second configuration causes the loudspeaker to be on the rear side of the electronic device.

In one or more embodiments, an electronic device includes a device housing having a minor face coupled to a monorail by a bridge member. In one or more embodiments, the monorail comprises a monorail body with a first electrical connector positioned at a first end of the monorail body and a second electrical connector positioned at a second end of the monorail body. In one or more embodiments, the first electrical connector and the second electrical connector are of the same type. For instance, the first electrical connector and the second electrical connector can be both be female universal serial bus type-C connectors in one embodiment. In other embodiments, the first electrical connector and the second electrical connector can be a mini-universal serial bus connector. Other examples of connector types will be obvious to those of ordinary skill in the art having the benefit of this disclosure.

In one or more embodiments, an electronic device attachment is configured as an electronic device accessory comprising an attachment housing. In one or more embodiments, the attachment housing defines a monorail receiver having an aperture at a first end of the monorail receiver and a bounding wall at a second end of the monorail receiver. In one or more embodiments, a third electrical connector is positioned at or near the bounding wall. In one or more embodiments, the third electrical connector is complementary to the first electrical connector and the second electrical connector. Illustrating by example, if the first electrical connector and the second electrical connector are female universal serial bus type-C connectors, the third connector can be a male universal serial bus type-C connector, and so forth.

In one or more embodiments, one attaches the attachment to the electronic device by inserting one of the first end or the second end of the monorail into the aperture of the monorail receiver. One then slides the attachment along the monorail until the third connector couples to and engages one of the first electrical connector or the second electrical connector. Since the first electrical connector and the second electrical connector are of the same type in one or more embodiments, the attachment can be coupled to the electronic device in two configurations: a first configuration where the front face of the electronic device and the front face of the attachment face in the same direction, and a second configuration where the front face of the electronic device and the front face of the attachment face in opposite directions.

Illustrating by example, one can couple the attachment to the electronic device in the first configuration by inserting the first end of the monorail into the aperture of the monorail receiver and sliding either the attachment relative to the electronic device or the electronic device relative to the attachment such that the monorail inserts into the monorail receiver until the first electrical connector engages and couples to the third electrical connector.

By contrast, one can couple the attachment to the electronic device in the second configuration by inserting the second end of the monorail into the aperture of the monorail receiver and sliding either the attachment relative to the electronic device or the electronic device relative to the attachment such that the monorail inserts into the monorail receiver until the second electrical connector engages and couples to the third electrical connector.

Advantageously, this reversibility allows for greater system functionality. Illustrating by example, consider the situation where an attachment includes a display on the front major face and a camera on the rear major face. Assuming the electronic device has a display on its major face, one can couple the attachment to the electronic device in the first configuration such that the display of the electronic device and the display of the attachment are arranged side-by-side.

One or more processors within the electronic device can then use this "second" display of the attachment in unison with the display of the electronic device to create a larger overall display presentation area.

By contrast, when the attachment is coupled to the electronic device in the second configuration, the imager of the attachment is adjacent to the display of the electronic device. This allows the person to take "selfies," engage in video conferences, and perform other operations with the imager that would not be possible with the imager permanently situated on the rear face of the combined device. Advantageously, simply by "flipping" the accessory around, the person has the option of having an enlarged display at some times and a front-facing camera at others.

Embodiments of the disclosure offer other advantages as well. In one or more embodiments, when no attachment is coupled to an electronic device, the physical form factor of the system is reduced. This advantageously allows a user to separate the electronic device from the attachment and employ only the electronic device as a "miniature" version. However, by reattaching the attachment, the person could use an expanded display, additional cameras or microphones, additional loudspeakers, and so forth. These features can be added or removed as desired simply by attaching or removing an attachment from the electronic device. Still other advantages of embodiments of the disclosure will be described below. Still others will be obvious to those of ordinary skill in the art having the benefit of this disclosure.

Figure 2:
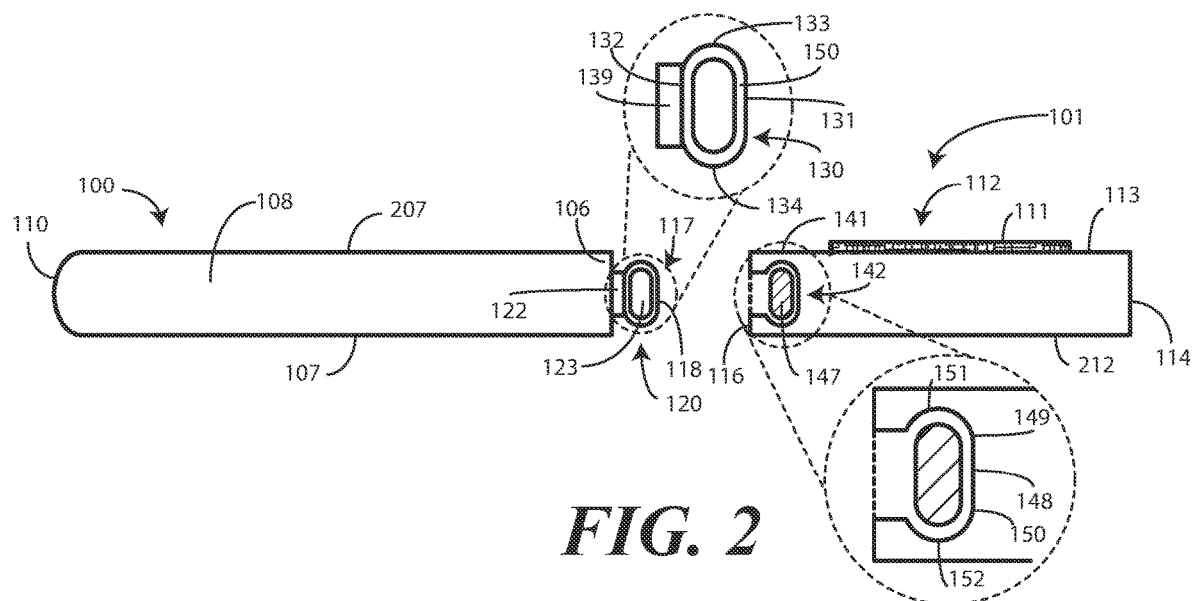
FIG. 2 illustrates left side elevation view of one explanatory system in accordance with one or more embodiments of the disclosure.
Figure 3:
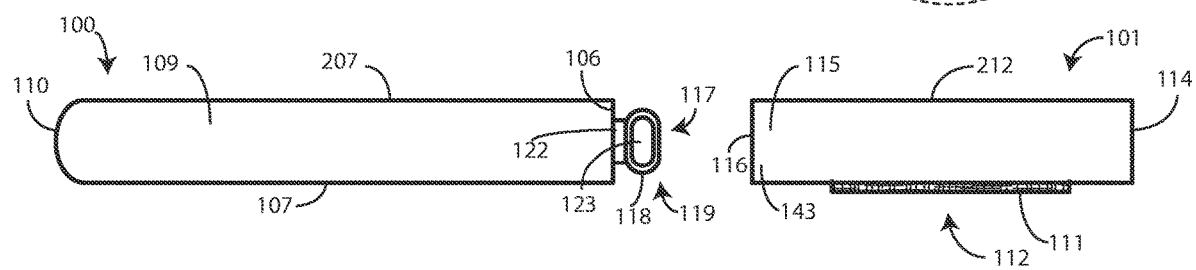
FIG. 3 illustrates right side elevation view of one explanatory system in accordance with one or more embodiments of the disclosure.
Figure 4:
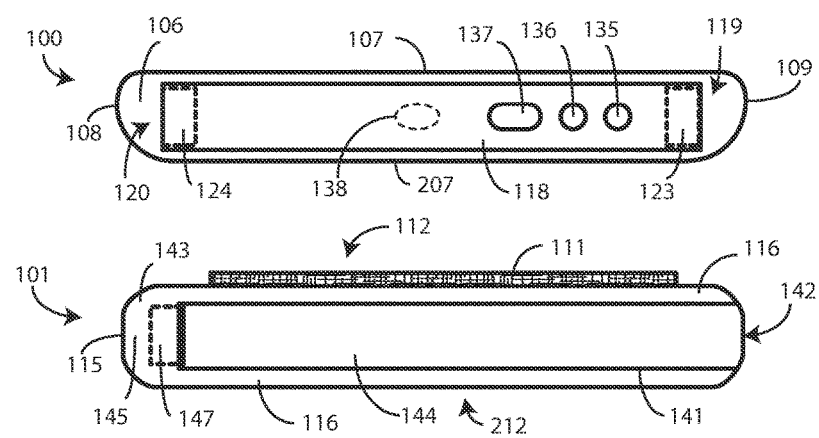
FIG. 4 illustrates a top plan view of one explanatory system in accordance with one or more embodiments of the disclosure.

Referring now to FIGS. 1-4, illustrated therein is one explanatory electronic device 100 and one explanatory attachment 101 configured in accordance with one or more embodiments of the disclosure. FIG. 1 illustrates a front elevation view of the electronic device 100 and attachment 101, while FIG. 2 illustrates a left side elevation view of the same. FIG. 3 illustrates a right side elevation view of the electronic device 100 and attachment 101, while FIG. 4 illustrates a top plan view thereof. In one or more embodiments, the attachment 101 can be selectively attached to, or detached from, the electronic device 100 or an electronic device module.

The electronic device 100 of FIG. 1 is shown as a portable electronic device. In one or more embodiments, the electronic device 100 is capable of operating as a stand-alone electronic device when no attachment 101 is coupled to the electronic device 100. However, in other embodiments, the electronic device 100 is selectively attachable and detachable from one or more attachments, configured as device accessories, which provide secondary functionality such as delivery of acoustic output, visual output, or other output. Where attachable and detachable from the attachment 101, the combination of the electronic device 100 and the attachment 101 form a modular system.

The electronic device 100 of FIG. 1 is shown illustratively as a smartphone. For simplicity, this embodiment will be described as an illustrative example. However, the electronic device 100 can take other forms as well, including as a palm top computer, a gaming device, a laptop computer, a multimedia player, and so forth. Still other examples of electronic devices will be obvious to those of ordinary skill in the art having the benefit of this disclosure.

In one or more embodiments, the electronic device 100 includes a device housing 102. The device housing 102 can include one or more housing portions, such as a first housing portion and a second housing portion, e.g., a front housing portion coupled to a rear housing portion. In this illustrative embodiment, the device housing 102 is disposed about the periphery of a display 103, thereby defining a front major face 107 of the electronic device 100. The rear side of the electronic device 100 defines a rear major face 207 of the electronic device 100. In one or more embodiments, the front major face 107 of the electronic device 100 is separated from the rear major face 207 of the electronic device 100 by one or more minor faces 106,108,109,110 of the device housing 102.

In one or more embodiments, the attachment includes also an attachment housing 104. The attachment housing 104 can include one or more housing portions, such as a first housing portion and a second housing portion, e.g., a front housing portion coupled to a rear housing portion. In this illustrative embodiment, the attachment housing 104 is disposed about the periphery of a loudspeaker 111. A loudspeaker 111 is one example of an output device that the attachment housing 104 can support to provide additional functionality for the electronic device 100 when the attachment 101 is coupled to the electronic device 100. However, as will be described in more detail with reference to FIG. 10 below, the attachment 101 can support other output devices, input devices, energy storage devices, memory devices, or other components as well.

In this illustrative embodiment, the attachment housing 104 and the loudspeaker 111 define a front major face 112 of the attachment 101. The rear side of the attachment 101 defines a rear major face 212 of the attachment 101. In one or more embodiments, the front major face 112 of the attachment 101 is separated from the rear major face 212 of the attachment 101 by one or more minor faces 113,114, 115,116 of the attachment housing 104.

In one or more embodiments, at least one combined mechanical and electrical connector is coupled to the electronic device 100. In the illustrative embodiment of FIG. 1, only one such connector is shown coupled to the electronic device 100. However, embodiments of the disclosure are not so limited. As will be shown below with reference to FIGS. 15-16, in some embodiments, two, three, or more connectors could be coupled to the electronic device 100.

In this illustrative embodiment, the combined mechanical and electrical connector comprises a monorail 117 configured as a mechanical connector. The mechanical connector is referred to herein a "monorail" since it defines a single rail or bar along which the attachment 101 slides when coupling to the electronic device 100. In one or more embodiments, the monorail 117 comprises a monorail body 118 defining a first end 119 and a second end 120. In one or more embodiments, the monorail body 118 separates the first end 119 and the second end 120 from each other along a major axis 121 of the monorail body 118.

In one or more embodiments, the monorail 117 and the monorail body 118 are symmetrical about a centerline 140 passing through the electronic device 100. This symmetry, as will be described in more detail below with reference to FIGS. 7-8, allows the attachment 101 to be reversibly coupled to the monorail 117 such that the front major face 112 or the rear major face 212 is oriented in the same direction as the display 103 of the electronic device 100.

In one or more embodiments, a bridge member 122 mechanically couples the monorail 117 to a minor face, e.g., minor face 106 in this illustrative example, of the device housing 102. In one or more embodiments, the device housing 102, the bridge member 122, and the monorail 117 are configured from a common material as a single, unitary, integral part. For instance, the device housing 102, the bridge member 122, and the monorail 117 can be configured as a single, unitary thermoplastic part from an injection molding process in one embodiment. In another embodiment where the device housing 102 comprises a front housing portion and a rear portion, the front housing portion, a half bridge member, and a half monorail body member can be formed as a single, unitary thermoplastic part, while the rear housing portion, another half bridge member, and another half monorail body member can be formed as a second, single, unitary thermoplastic part, which can be joined to the front part, and so forth.

In another embodiment, the bridge member 122 and the monorail body 118 are attached to the device housing 102. For instance, it may be desirable to manufacture the bridge member 122 and/or monorail body 118 from a first material, such as stainless steel or aluminum, while the device housing 102 is manufactured from a second, different material, such as glass or plastic. Accordingly, in such an embodiment the bridge member 122 and/or monorail body 118 can be manufactured as a separate part and later attached to the device housing 102, and so forth. These examples are illustrative only, as numerous other materials and manufacturing techniques for making unitary parts will be obvious to those of ordinary skill in the art having the benefit of this disclosure.

In one or more embodiments, a first electrical connector 123 is positioned at the first end 119 of the monorail body 118, while a second electrical connector 124 is positioned at the second end 120 of the monorail body 118. To make the monorail 117 a reversible mechanical and electrical connector, thereby allowing the attachment 101 to be attached to the electronic device 100 in a first configuration where the front major face 107 of the electronic device 100 and the front major face 112 of the attachment 101 face in the same direction, or in a second configuration where the front major face 107 of the electronic device 100 and the front major face 112 of the attachment 101 face in opposite directions, the first electrical connector 123 and the second electrical connector 124 are of the same type. Said differently, to make the monorail 117 symmetrical, in one or more embodiments the first electrical connector 123 is the same type of connector as the second electrical connector 124.

Illustrating by example, in one or more embodiments the first electrical connector 123 and the second electrical connector 124 each comprise universal serial bus connectors. In one or more embodiments, the first electrical connector 123 and the second electrical connector 124 each comprise universal serial bus type-C connectors. In one or more embodiments, the first electrical connector 123 and the second electrical connector 124 each comprise female universal serial bus type-C connectors.

However, embodiments of the disclosure are not so limited, as the first electrical connector 123 and the second electrical connector 124 can each comprise other types of connectors as well. For instance, in another embodiment the first electrical connector 123 and the second electrical connector 124 each comprise a universal serial bus type-A connector. In another embodiment, the first electrical connector 123 and the second electrical connector 124 each comprise universal serial bus type-B connectors. In still another embodiment, the first electrical connector 123 and the second electrical connector 124 each comprise micro-universal serial bus type-A connectors. In yet another embodiment, the first electrical connector 123 and the second electrical connector 124 each comprise micro-universal serial bus type-B connectors. In another embodiment, the first electrical connector 123 and the second electrical connector 124 each comprise universal serial bus mini-type-B connectors, which can be either four-pin connectors or five-pin connectors. In still another embodiment, the first electrical connector 123 and the second electrical connector 124 each comprise proprietary connectors, such as those used by Motorola Mobility.sup.™, e.g. V3 or V8 connectors, or proprietary connectors of other device manufacturers. The first electrical connector 123 and the second electrical connector 124 can each comprise male connectors in one or more embodiments. The first electrical connector 123 and the second electrical connector 124 can each comprise female connectors in other embodiments. These examples of connectors suitable for use as the first electrical connector 123 and the second electrical connector 124 are illustrative only, as numerous others will be obvious to those of ordinary skill in the art having the benefit of this disclosure.

As best seen in FIGS. 1-3, in one or more embodiments the first electrical connector 123 and the second electrical connector 124 are concentrically aligned with the monorail body 118 about the major axis 121 of the monorail body 118. Where the first electrical connector 123 and the second electrical connector 124 are concentrically aligned with the monorail body 118 about the major axis 121 of the monorail body 118, the first electrical connector 123 and the second electrical connector 124 share a common center with the monorail body 118, which is the major axis 121. In this illustrative embodiment, the monorail body 118 completely surrounds the smaller first electrical connector 123 and second electrical connector 124. However, in other embodiments, the opposite can be true, with the monorail body 118 having a diameter less than that of the first electrical connector 123 and the second electrical connector 124, such that the perimeter of the first electrical connector 123 and the second electrical connector 124 is greater than another perimeter of the monorail body 118. Other configurations for the first electrical connector 123 and the second electrical connector 124 relative to one or both of the major axis 121 of the monorail body 118 or the monorail body 118 itself will be obvious to those of ordinary skill in the art having the benefit of this disclosure.

In one or more embodiments, each of the first electrical connector 123 and the second electrical connector 124 is configured to receive a first complementary connector. Illustrating by example, if the first electrical connector 123 and the second electrical connector 124 each comprise a female universal serial bus type-C connector, in one or more embodiments the first electrical connector 123 and the second electrical connector 124 are each configured to receive a male universal serial bus type-C connector. If the first electrical connector 123 and the second electrical connector 124 each comprise female Motorola Mobility.sup.™ V8-type connectors, in one or more embodiments the first electrical connector 123 and the second electrical connector 124 are configured to receive male Motorola Mobility.sup.™ V8-type connectors, and so forth.

In one or more embodiments, the first electrical connector 123 and the second electrical connector 124 are oriented such that each receives and couples to a complementary connector when that complementary connector approaches from different directions along the major axis 121 of the monorail body 118. Where, for example, the first electrical connector 123 and the second electrical connector 124 each comprise female universal serial bus type-C connectors, in one or more embodiments the first electrical connector 123 is open to receive male universal serial bus type-C connectors entering from a positive direction along the major axis 121 of the monorail body 118, while the second electrical connector 124 is open to receive male universal serial bus type-C connectors entering from a negative direction along the major axis 121 of the monorail body 118. As viewed in FIG. 1, the "positive" direction in this example would be down, while the "negative" direction would be opposite the positive direction, i.e., up. Thus, in the illustrative embodiment of FIG. 1, the first electrical connector 123 is open up, while the second electrical connector 124 is open down. Thus, in one or more embodiments the first electrical connector 123 is configured to receive a first complementary connector from a first direction 125 along the major axis 121 of the monorail body 118, while the second electrical connector 124 is configured to receive a second complementary connector from a second direction 126 along the major axis 121 of the monorail body 118, with wherein the first direction 125 is opposite the second direction 126 as shown in FIG. 1.

In one or more embodiments, the monorail body 118 has a monorail body length 127 along the major axis 121 of the monorail body 118 that is less than a minor face length 128 of the minor face 106 to which the monorail 117 is coupled. As best seen in FIGS. 1 and 4, this makes the monorail body 118 shorter in length than minor face 106. As will be described in more detail below, this allows for the accommodation of a complementary connector situated within a monorail receiver of the attachment 101 and a bounding wall of the monorail receiver to not extend beyond other minor faces 108,109 of the device housing 102 when the attachment 101 is coupled to the electronic device 100.

As best seen in FIGS. 2 and 3, in one or more embodiments, the bridge member 122 has a bridge member cross sectional area 139 that is less than a monorail cross sectional area 150 of the monorail body 118. As will be described in more detail below, this "larger cross sectional area" of the monorail cross sectional area 150 compared to the bridge member cross sectional area 139 retains the attachment 101 to the electronic device 100 when the monorail 117 is inserted into the monorail receiver of the attachment 101.

As best seen in FIG. 1, in one or more embodiments the bridge member 122 has a bridge member length 129 that is less than the monorail body length 127. In one or more embodiments, the perimeter 130 of the monorail body 118 defines a first linear side 131 and a second linear side 132. In one or more embodiments, the perimeter 130 of the monorail body 118 further defines a first partially circular side 133 and a second partially circular side 124. In one or more embodiments, the first partially circular side 133 and the second partially circular side 124 are positioned between the first linear side 131 and the second linear side 132. It should be noted that this is but one illustrative shape the perimeter 130 of the monorail body 118 can take. Numerous others will be obvious to those of ordinary skill in the art having the benefit of this disclosure. For example, in another embodiment the perimeter 130 of the monorail body 118 is circular in shape. In another embodiment, the perimeter 130 of the monorail body 118 is ovular in shape. In another embodiment, the perimeter 130 of the monorail body 118 is polygonal in shape. In another embodiment, the perimeter 130 of the monorail body 118 is curvilinear in shape, and so forth.

In one or more embodiments, one or more user input devices 135,136,137 are positioned along an exterior of the monorail body 118. In one or more embodiments, the one or more user input devices 135,136,137 are positioned along one of the first linear side 131 or the second linear side 132 of the perimeter 130 of the monorail body 118. In this illustrative embodiment, the one or more user input devices 135,136,137 are positioned on the first linear side 131 of the perimeter 130 of the monorail body 118.

In one or more embodiments, the one or more user input devices 135,136,137 are electrically coupled to one or more processors (described below with reference to FIG. 5) situated within the device housing 102. A user can deliver input and control commands to the one or more processors by interacting with the one or more user input devices 135,136, 137 in one or more embodiments. In this illustrative embodiment, the one or more user input devices 135,136,137 each comprise push buttons. However, embodiments of the disclosure are not so limited. In other embodiments, the one or more user input devices 135,136,137 can comprise touch-sensitive surfaces. In other embodiments, the one or more user input devices 135,136,137 can comprise any of rockers, sliders, capacitive sensors, microphones, or other user input devices. Moreover, the one or more user input devices 135,136,137 can all be the same, or can be different. Illustrating by example, user input devices 135,136 can be push buttons while user input device 137 is a capacitive touch sensor. Alternatively, user input device 135 can be a push button, while user input device 136 is a microphone and user input device 137 is a touch sensor. Other configurations for the one or more user input devices 135,136,137 will be obvious to those of ordinary skill in the art having the benefit of this disclosure.

In one or more embodiments, an attachment retention device 138 is mechanically coupled to, or integrated with, the monorail body 118. The attachment retention device 138 can function to retain the attachment 101 in an attached configuration to the electronic device 100 in one or more embodiments. The attachment retention device 138 can take various forms. In one or more embodiments, the attachment retention device 138 comprises a mechanical protrusion or latch extending from the perimeter 130 of the monorail body 118. In another embodiment, the attachment retention device 138 comprises a detent or recess extending into the monorail body 118. In still another embodiment, the attachment retention device 138 comprises one or more of a magnetic coupling, snap, protective casing coupling, boot coupling, static attachment connector, vertical locator, horizontal locator, or other type of retention device. These examples of the attachment retention device 138 are illustrative only, as numerous other retention devices will be obvious to those of ordinary skill in the art having the benefit of this disclosure. Moreover as an alternate to the attachment retention device 138, the attachment 101 can be attached to the electronic device 100 using static adhesion, mechanical suction, or in other ways. In still other embodiments, no attachment retention device 138 will be included, as frictional and other mechanical coupling between the first electrical connector 123 or the second electrical connector 124 and the complementary connector of the attachment 101 will satisfactorily retain the attachment 101 to the electronic device 100.

Turning attention now to the attachment 101, in one or more embodiments the attachment housing 104 defines a monorail receiver 141. In one or more embodiments, the monorail receiver 141 defines an aperture 142 at a first end along a first minor face 113. In one or more embodiments, the monorail receiver 141 defines a bounding wall 143 at a second end along a second, opposite minor face 115 that is separated from first minor face 113 by an intervening minor face 116. A slot 144 extends along the intervening minor face 116 from the aperture 142 toward the bounding wall 143, but stops short of the bounding wall 143, thereby leaving a slot stop 145 positioned between the terminating edge of the slot 144 and the bounding wall 143. In the illustrative embodiment of FIGS. 1-4, the first end of the monorail receiver 141 is separated from the second end by a major axis 146 of the monorail receiver 141.

In one or more embodiments, an electrical connector 147 is situated within the monorail receiver 141 at the bounding wall 143. In one or more embodiments, the electrical connector 147 abuts the bounding wall 143. In other embodiments, the electrical connector 147 is situated adjacent to the bounding wall 143. Other placements for the electrical connector 147 will be obvious to those of ordinary skill in the art having the benefit of this disclosure.

In one or more embodiments, the electrical connector 147 is configured to engage either the first electrical connector 123 of the monorail 117 of the electronic device 100 or the second electrical connector 124 of the monorail 117 of the electronic device 100. Accordingly, in one or more embodiments the electrical connector 147 is configured as the mechanical complement to both the first electrical connector 123 of the monorail 117 of the electronic device 100 or the second electrical connector 124 of the monorail 117 of the electronic device 100.

Illustrating by example, where the first electrical connector 123 and the second electrical connector 124 each comprise universal serial bus connectors, the electrical connector 147 situated within the monorail receiver 141 at the bounding wall 143 can also comprise a universal serial bus connector. Where the first electrical connector 123 and the second electrical connector 124 each comprise universal serial bus type-C connectors, electrical connector 147 situated within the monorail receiver 141 at the bounding wall 143 can also comprise a universal serial bus type-C connector. Where the first electrical connector 123 and the second electrical connector 124 each comprise female universal serial bus type-C connectors, the electrical connector 147 situated within the monorail receiver 141 at the bounding wall 143 can comprise a male universal serial bus type-C connector, and so forth.

Where the first electrical connector 123 and the second electrical connector 124 each comprise a universal serial bus type-A connector, electrical connector 147 situated within the monorail receiver 141 at the bounding wall 143 can comprise a complementary universal serial bus type-A connector. Where the first electrical connector 123 and the second electrical connector 124 each comprise universal serial bus type-B connectors, the electrical connector 147 situated within the monorail receiver 141 at the bounding wall 143 can comprise a complementary universal serial bus type-B connector. In still another embodiment, where the first electrical connector 123 and the second electrical connector 124 each comprise micro-universal serial bus type-A connectors, so too can the electrical connector 147 situated within the monorail receiver 141 at the bounding wall 143, albeit a complementary connector, e.g., male where the first electrical connector 123 and the second electrical connector 124 are female connectors, and so forth. Where the first electrical connector 123 and the second electrical connector 124 each comprise micro-universal serial bus type-B connectors, the electrical connector 147 situated within the monorail receiver 141 at the bounding wall 143 can comprise a complementary micro-universal serial bus type-B connector. Where the first electrical connector 123 and the second electrical connector 124 each comprise universal serial bus mini-type-B connectors, which can be either four-pin connectors or five-pin connectors, the electrical connector 147 situated within the monorail receiver 141 at the bounding wall 143 can comprise a mechanically complementary universal serial bus mini-type-B connector with the same number of pins.

Where connectors other than the universal serial bus type connectors are used for the first electrical connector 123 and the second electrical connector 124, electrical connector 147 situated within the monorail receiver 141 at the bounding wall 143 can still be configured to as to mechanically and electrically couple to either the first electrical connector 123 or the second electrical connector 124. For example, where the first electrical connector 123 and the second electrical connector 124 each comprise proprietary connectors, such as those used by Motorola Mobility.sup.™, e.g. V3 or V8 connectors, or proprietary connectors of other device manufacturers, the electrical connector 147 situated within the monorail receiver 141 at the bounding wall 143 can comprise a mechanically complementary connector of the same type.

Where the first electrical connector 123 and the second electrical connector 124 can each comprise male connectors, the electrical connector 147 situated within the monorail receiver 141 at the bounding wall 143 can comprise a female connector in one or more embodiments. Where the first electrical connector 123 and the second electrical connector 124 can each comprise female connectors, the electrical connector 147 situated within the monorail receiver 141 at the bounding wall 143 can comprise a male connector in other embodiments. These examples of connectors suitable for use as the electrical connector 147 situated within the monorail receiver 141 at the bounding wall 143 are illustrative only, as numerous others will be obvious to those of ordinary skill in the art having the benefit of this disclosure.

As will be described below with reference to FIG. 6, in one or more embodiments one or more electrical components are situated within the attachment housing 104. The one or more electrical components can provide attachment functionality. For instance, the attachment 101 of FIGS. 1-4 includes a loudspeaker 111. Loudspeaker drivers, filter circuits, energy storage devices, signal processors, and other components can be included within the attachment housing 104 so that audio output can be delivered by the loudspeaker 111. In one or more embodiments, the electrical connector 147 situated within the monorail receiver 141 at the bounding wall 143 is electrically coupled to these one or more electrical components.

Recall from above that in one or more embodiments the monorail body 118 has a monorail body length 127 along the major axis 121 of the monorail body 118 that is less than a minor face length 128 of the minor face 106 to which the monorail 117 is coupled. As best seen in FIGS. 1 and 4, this makes the monorail body 118 shorter in length than minor face 106.

This shorter length allows for the electrical connector 147 situated within the monorail receiver 141 at the bounding wall 143 to couple with one of the first electrical connector 123 or the second electrical connector 124, while still leaving enough room for the bounding wall 143 such that the minor face 115 of the attachment 101 does not extend beyond the minor face 109 of the electronic device 100 when the attachment 101 is coupled to the electronic device 100.

When the attachment 101 is coupled to the electronic device 100, in one or more embodiments the monorail body 118 inserts into the monorail receiver 141, with the bridge member 122 passing through the slot 144. The material of minor face 116 disposed to each side of the slot 144 then "wraps" about the monorail body 118, thereby retaining the attachment 101 to the electronic device 100 when the monorail 117 is inserted into the monorail receiver 141 of the attachment 101.

As best seen in FIG. 1, in one or more embodiments the bridge member 122 has a bridge member length 129 that is less than the monorail body length 127. This shorter length of the bridge member 122 allows the slot stop 145 to abut the bridge member 122 when the attachment 101 is attached to the electronic device 100 with the electrical connector 147 of the monorail receiver 141 coupled to and engaged with either the first electrical connector 123 or the second electrical connector 124.

In one or more embodiments, the shape of the monorail receiver 141 can be complementary to that of the monorail body 118. Illustrating by example, in one or more embodiments the perimeter 130 of the monorail body 118 defines a first linear side 131 and a second linear side 132. In one or more embodiments, the perimeter 130 of the monorail body 118 further defines a first partially circular side 133 and a second partially circular side 124. In one or more embodiments, the first partially circular side 133 and the second partially circular side 124 are positioned between the first linear side 131 and the second linear side 132.

Where this is the case, the monorail receiver 141 can define a planar wall 148 having a first edge 149 coupled to a first partially cylindrical wall 151. The planar wall 148 can have a second edge 150 coupled to a second partially cylindrical wall 152. In one or more embodiments, the first partially cylindrical wall 151 and the second partially cylindrical wall 152 extend from the planar wall 148 to the slot 144, which in this illustrative embodiment is configured as a rectangular aperture disposed along minor face 116 of the attachment housing 104 of the attachment 101.

It should be noted that this is but one illustrative shape the interior surfaces of the monorail receiver 141 can take. Numerous others will be obvious to those of ordinary skill in the art having the benefit of this disclosure. For example, in another embodiment the shape the interior surfaces of the monorail receiver 141 can be circular. In another embodiment, the shape the interior surfaces of the monorail receiver 141 are ovular. In another embodiment, the shape the interior surfaces of the monorail receiver 141 are polygonal. In another embodiment, the shape the interior surfaces of the monorail receiver 141 are curvilinear, and so forth.

In one or more embodiments, one or more user input devices 153,154,155 are positioned along an exterior of the attachment housing 104. In one or more embodiments, the one or more user input devices 153,154,155 are positioned along a minor face 114 of the attachment housing 104.

When the monorail 117, which includes one or more user input devices 135,136,137, is inserted into the monorail receiver 141, the one or more user input devices 135,136, 137 will be covered by the attachment housing 104. In one or more embodiments, the one or more user input devices 153,154,155 of the attachment housing 104 are then electrically coupled to one or more processors (described below with reference to FIG. 5) situated within the device housing 102 by way of the electrical connector 147 situated within the monorail receiver 141 engaging and coupling either the first electrical connector 123 of the monorail 117 or the second electrical connector 124 of the monorail 117.

This allows the one or more user input devices 153,154, 155 to, in one or more embodiments, perform the exact same functions as the one or more user input devices 135,136,137 of the monorail 117 when the attachment 101 is coupled to the electronic device 100. A user can deliver input and control commands to the one or more processors by interacting with the one or more user input devices 153,154,155 in one or more embodiments. If, for example, user input device 135 is a volume up button when the attachment 101 is detached from the electronic device 100, user input device 153 can serve as the same volume up button when the attachment 101 is attached to the electronic device 100, and so forth.

As with the user input devices 135,136,137 of the monorail 117, the one or more user input devices 153,154,155 of the attachment housing 104 can each comprise push buttons. However, embodiments of the disclosure are not so limited. In other embodiments, the one or more user input devices 153,154,155 can comprise touch-sensitive surfaces. In other embodiments, the one or more user input devices 153,154, 155 can comprise any of rockers, sliders, capacitive sensors, microphones, or other user input devices. Moreover, the one or more user input devices 153,154,155 can all be the same, or can be different, as previously described above with reference to user input devices 135,136,137. Still other configurations for the one or more user input devices 153, 154,155 will be obvious to those of ordinary skill in the art having the benefit of this disclosure.

In one or more embodiments, where an attachment retention device 138 is mechanically coupled to, or integrated with, the monorail body 118, a complementary attachment retention device 158 is coupled to, or integrated into, the monorail receiver 141. In one or more embodiments, the complementary attachment retention device 158 can couple to or engage the attachment retention device 138 to help retain the attachment 101 in an attached configuration to the electronic device 100 in one or more embodiments.

As with the attachment retention device 138, the complementary attachment retention device 158 can take various forms. In one or more embodiments, the complementary attachment retention device 158 comprises a detent or recess mechanical extending into the inner surface of the monorail receiver 141. In another embodiment, the complementary attachment retention device 158 comprises a protrusion or complementary latch extending from the inner surface of the monorail receiver 141. In still another embodiment, the complementary attachment retention device 158 comprises one or more of a magnetic coupling, snap, protective casing coupling, boot coupling, static attachment connector, vertical locator, horizontal locator, or other type of retention device. These examples of the complementary attachment retention device 158 are illustrative only, as numerous other retention devices will be obvious to those of ordinary skill in the art having the benefit of this disclosure.

In one or more embodiments, the electronic device 100 and the attachment 101 can include complementary or common components. For example, the electronic device 100 and attachment 101 may both include components for receiving user input, such as loudspeakers, microphones, earpiece speakers, and the like. When such components are included in the attachment 101 and the electronic device 100, a user can—for example—deliver voice input to a microphone disposed in the electronic device 100 or the attachment 101. An electrical connection using the electrical connector 147 situated in the monorail receiver 141 and one of the first electrical connector 123 or the second electrical connector 124 can deliver user input received by the attachment 101, for example at the user input devices 153,154, 155, to the electronic device 100 in one or more embodiments.

The attachment 101 can be equipped with additional features as well. Illustrating by example, while the attachment 101 of FIGS. 1-4 includes a loudspeaker 111, in one or more embodiments the attachment 101 can include a camera or other device to enhance electronic device operation. The camera can be carried on the attachment housing 104 of the attachment 101 to provide an enhanced feature for the electronic device 100 in one or more embodiments. This example of a camera illustrates only one of many various options that can be included to provide various features and devices that can be incorporated into the attachment 101 beyond just the loudspeaker 111. Others will be described below with reference to FIG. 10. Numerous other various combinations and permutations of features to include within the attachment 101 beyond a loudspeaker 111 or camera will be obvious to those of ordinary skill in the art having the benefit of this disclosure.

It is to be understood that FIGS. 1-4 are provided for illustrative purposes only and for illustrating components of one electronic device 100 and attachment 101 in accordance with embodiments of the disclosure. These figures are not intended to be a complete schematic diagram of the various components required for an electronic device 100 or attachment 101. Therefore, other electronic devices and attachments in accordance with embodiments of the disclosure may include various other components not shown in FIGS. 1-4, or may include a combination of two or more components or a division of a particular component into two or more separate components, and still be within the scope of the present disclosure.

Figure 5:
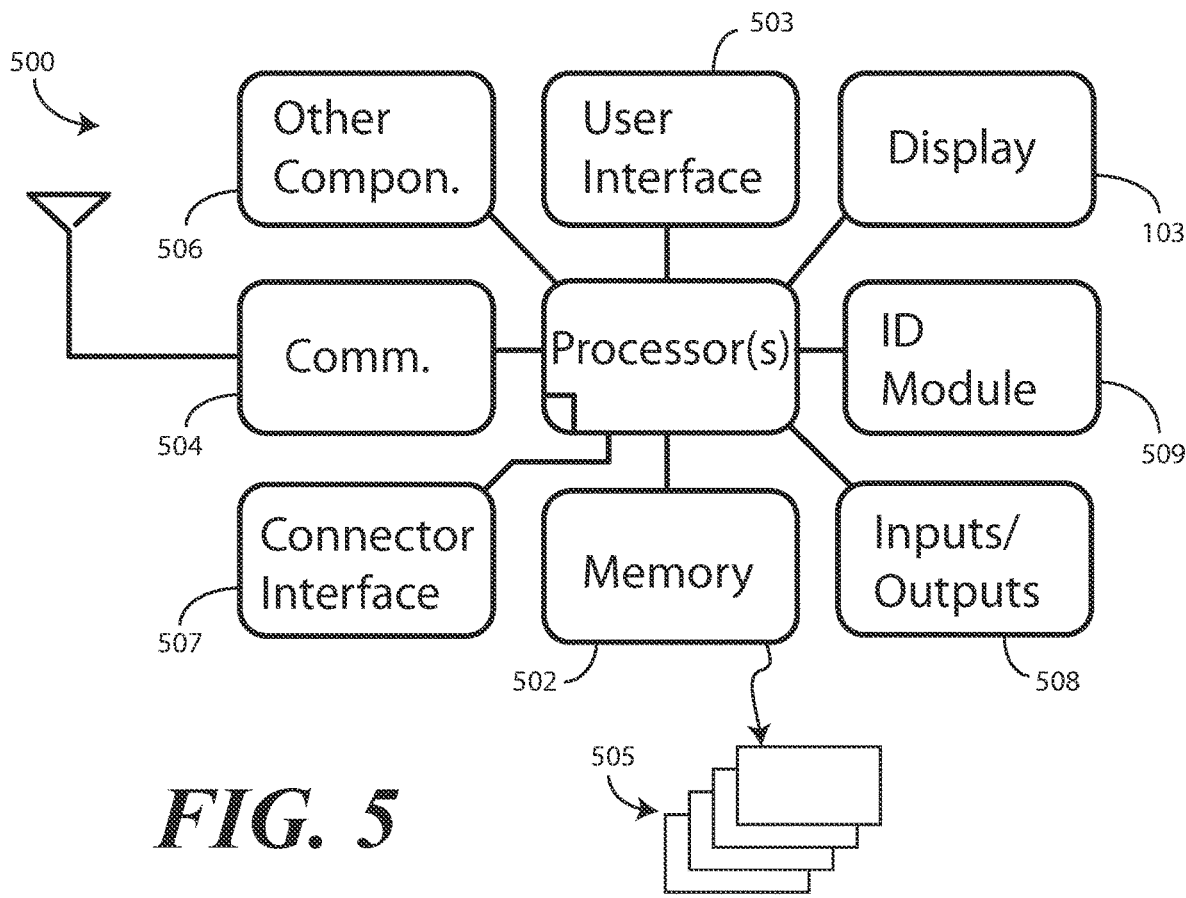
FIG. 5 illustrates a schematic block diagram of one explanatory electronic device in accordance with one or more embodiments of the disclosure.

Turning now to FIG. 5, illustrated therein is a block diagram schematic 500 of the explanatory electronic device (100) described above with reference to FIG. 1. In one embodiment, the electronic device (100) includes one or more processors 501. The one or more processors 501 are operable with the display 103 and other components of the electronic device (100). The one or more processors 501 can include a microprocessor, a group of processing components, one or more Application Specific Integrated Circuits (ASICs), programmable logic, or other type of processing device. The one or more processors 501 can be operable with the various components of the electronic device (100). The one or more processors 501 can be configured to process and execute executable software code to perform the various functions of the electronic device (100).

A storage device, such as memory 502, can optionally store the executable software code used by the one or more processors 501 during operation. The memory 502 may include either or both static and dynamic memory components, may be used for storing both embedded code and user data. The software code can embody program instructions and methods to operate the various functions of the electronic device (100), and also to execute software or firmware applications and modules. The one or more processors 501 can execute this software or firmware, and/or interact with modules, to provide device functionality.

As noted above, in one or more embodiments the electronic device (100) includes a display 103, which may optionally be touch-sensitive. In one embodiment where the display 103 is touch-sensitive, the display 103 can serve as a primary user interface 503 of the electronic device (100). Users can deliver user input to the display 103 of such an embodiment by delivering touch input from a finger, stylus, or other objects disposed proximately with the display. The user interface 503 can also include one or more user input devices (135,136,137), as previously described.

In one embodiment, the display 103 is configured as an organic light emitting diode (OLED) display. However, it should be noted that other types of displays would be obvious to those of ordinary skill in the art having the benefit of this disclosure. In one embodiment, the display 103 includes an electroluminescent layer or light-emitting diode (LED) backlighting layer disposed beneath the display 103 to project light through the display 103. The display 103 can adaptively present text, graphics, images, user actuation targets, data, and controls along the display surface.

In this illustrative embodiment, the electronic device (100) also includes an optional communication circuit 504 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 504 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 504 can include wireless communication circuitry, one of a receiver, a transmitter, or transceiver, and one or more antennas.

The one or more processors 501 can be responsible for performing the primary functions of the electronic device (100). For example, in one embodiment the one or more processors 501 comprise one or more circuits operable with one or more user interface devices, which can include the display 103, to present presentation information to a user. The executable software code used by the one or more processors 501 can be configured as one or more modules 505 that are operable with the one or more processors 501. Such modules 505 can store instructions, control algorithms, and so forth. While these modules 505 are shown as software stored in the memory 502, they can be hardware components or firmware components integrated into the one or more processors 501 as well.

Other components 506 can be included with the electronic device 100. The other components 506 can be operable with the one or more processors 501 and can include input and output components associated with a user interface 503, such as power inputs and outputs, audio inputs and outputs, and/or mechanical inputs and outputs. The other components 506 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. Still other components will be obvious to those of ordinary skill in the art having the benefit of this disclosure.

In one or more embodiments, a connector interface 507 comprises one or more electrical connectors that are electrically coupled to the one or more processors 501. The connector interface 507 can include mechanical connectors, such as the monorail (117) described above. The electrical connectors of the connector interface 507 that are electrically coupled to the one or more processors 501 include the first electrical connector (123) positioned at the first end (119) of the monorail body (118), the second electrical connector (124) positioned at the second end (120) of the monorail body (118), or other electrical connectors.

One or more inputs and outputs 508 can be operable with the one or more processors 501 in one or more embodiments. The one or more inputs and outputs 508 can be configured to receive input from, or deliver output to, an environment about the electronic device (100). Illustrating by example, the inputs and outputs 508 can include devices for determining information such as motion, bearing, location, acceleration, orientation, proximity to people and other objects, incident light amounts, and so forth. The one or more inputs and outputs 508 can include various combinations of microphones, location detectors, motion sensors, physical parameter sensors, temperature sensors, barometers, proximity sensor components, proximity detector components, wellness sensors, touch sensors, cameras, audio capture devices, and so forth.

The one or more inputs and outputs 508 can also include audio sensors and video sensors (such as a camera). The one or more inputs and outputs 508 can also include motion detectors, such as one or more accelerometers or gyroscopes. The motion detectors can detect movement, and direction of movement, of the electronic device (100) by a user. The one or more inputs and outputs 508 can also be used to detect gestures. For example, the other one or more inputs and outputs 508 can include one or more proximity sensors that detect the gesture of a user waving a hand above the display 103. It should be clear to those of ordinary skill in the art having the benefit of this disclosure that additional sensors can be included as well. Moreover, other types of inputs and outputs 508 will be obvious to those of ordinary skill in the art having the benefit of this disclosure.

As noted above, in one or more embodiments the electronic device (100) is operational in a first configuration as a stand-alone electronic device. However, in other embodiments, the electronic device (100) is selectively attachable and detachable from an attachment (101). Where this is the case, an optional identification module 509 can be configured to determine whether an attachment (101) is coupled to the electronic device (100). In one or more embodiments, the identification module 509 can detect not only whether an attachment is coupled to the electronic device (100), but the type of attachment as well.

For example, where the electrical connector (147) situated within the monorail receiver (141) at the bounding wall (143) engages either the first electrical connector (123) of the monorail (117) of the electronic device (100) or the second electrical connector (124) of the monorail (117) of the electronic device (100), the identification module 509 is operable the with either the first electrical connector (123) of the monorail (117) of the electronic device (100) or the second electrical connector (124) of the monorail (117) of the electronic device (100) to determine what type of attachment (101) is coupled to the third electrical connector (147). When the third electrical connector (147) is electrically coupled to either the first electrical connector (123) of the monorail (117) of the electronic device (100) or the second electrical connector (124) of the monorail (117) of the electronic device (100), in one embodiment the identification module 509 can identify the attachment (101) by exchanging electrical signals with the third electrical connector (147) of the attachment (101). Other examples of identification techniques will be obvious to those of ordinary skill in the art having the benefit of this disclosure.

Figure 6:
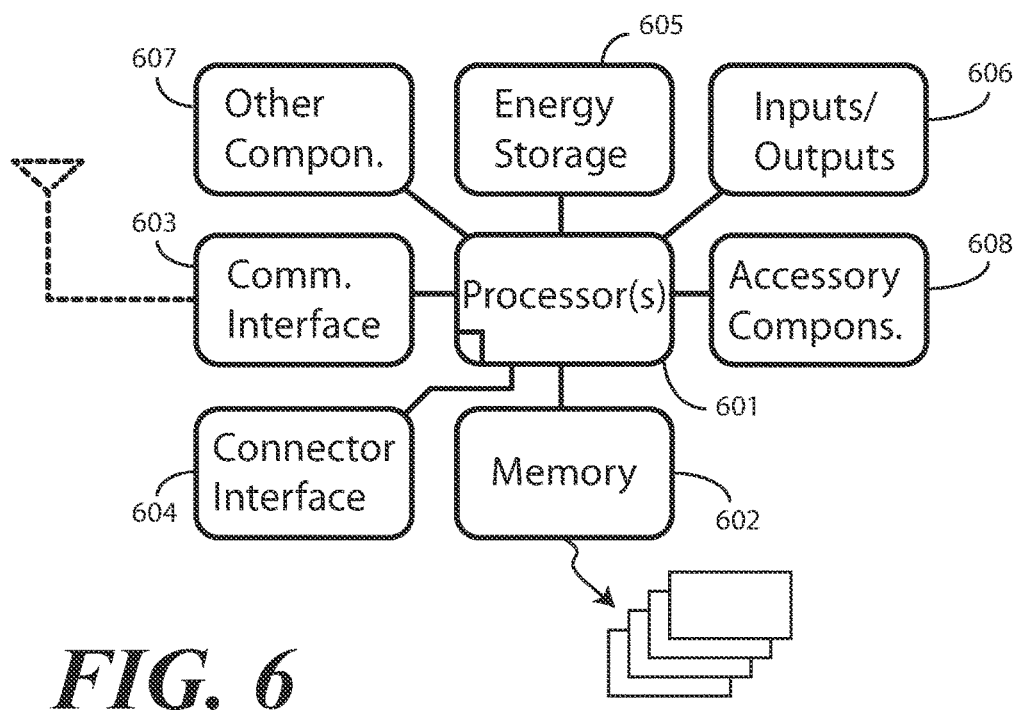
FIG. 6 illustrates a schematic block diagram of one explanatory electronic device attachment in accordance with one or more embodiments of the disclosure.

Turning now to FIG. 6, illustrated therein are additional components that may be included in attachments configured in accordance with one or more embodiments of the disclosure. The components can be included in various combinations, with some attachments including more components, while other attachments include fewer components, and so forth. Said differently, FIG. 6 shows only one explanatory component group forming part of an environment within which aspects of the present disclosure may be implemented. It will be appreciated that additional or alternative components may be used in a given implementation depending upon user preference, component availability, price point, and other considerations. All or some of the components communicate with one another by way of one or more shared or dedicated internal communication links, such as an internal bus.

In one or more embodiments, an attachment (101) can include, in addition to, or in place of, the one or more loudspeakers (111) described above, a control circuit 601, a memory 602, a communication interface 603, a connector interface 604, an energy source 605 or storage device, inputs and outputs 606, one or more other components 607, and one or more accessory components 608.

The control circuit 601 may be any of a microprocessor, microcomputer, application-specific integrated circuit, or the like, and is operable with the inputs and outputs 606, one or more other components 607, and one or more accessory components 608 of the attachment (101). The memory 602 may reside on the same integrated circuit as the control circuit 601, or alternatively may be a separate component. The memory 602 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 602 may include a read only memory (i.e., a hard drive, flash memory or any other desired type of memory device).

Information that is stored by the memory 602 can include program code associated with operating the inputs and outputs 606, one or more other components 607, and one or more accessory components 608, receiving information to control the inputs and outputs 606, one or more other components 607, and one or more accessory components 608, or to other informational data, e.g., program parameters, process data, etc. The operation of the control circuit 601 can be in accordance with executable instructions stored in a non-transitory computer readable medium (e.g., memory 602) to control basic functions of the attachment (101) and its inputs and outputs 606, one or more other components 607, and one or more accessory components 608.

In one or more embodiments, the control circuit 601 is programmed to interact with the other components of the attachment (101) to perform certain functions. The control circuit 601 may include or implement various modules and execute programs for initiating different activities. The communication interface 603 can be used for communication with an electronic device (100) to which an attachment (101) including this component group is attached.

For example, where an electronic device includes a first electrical connector (123) and a second electrical connector (124) disposed at either end of a monorail body (118), the communication interface 603 can be responsible for sending and receiving electrical signals between these electrical connectors by way of the electrical connector (147) situated within the monorail receiver (141) at the bounding wall (143) of the attachment (101). These electrical signals can include signals from the inputs and outputs 606, one or more other components 607, and one or more accessory components 608, and so forth. Other electrical signals handled by the communication interface 603 will be obvious to those of ordinary skill in the art having the benefit of this disclosure.

In one or more embodiments, the attachment (101) may include its own energy source 605, with which the control circuit 601, and/or other components can be powered. The inclusion of a dedicated energy source 605 prevents draining the energy source of the electronic device (100) to energize the various components of the attachment (101), thereby extending runtime of the electronic device (100) when the attachment (101) is coupled thereto. The energy source 605 can include a battery or fuel cell for providing power to various components of the attachment (101) and their corresponding components.

Figure 10:
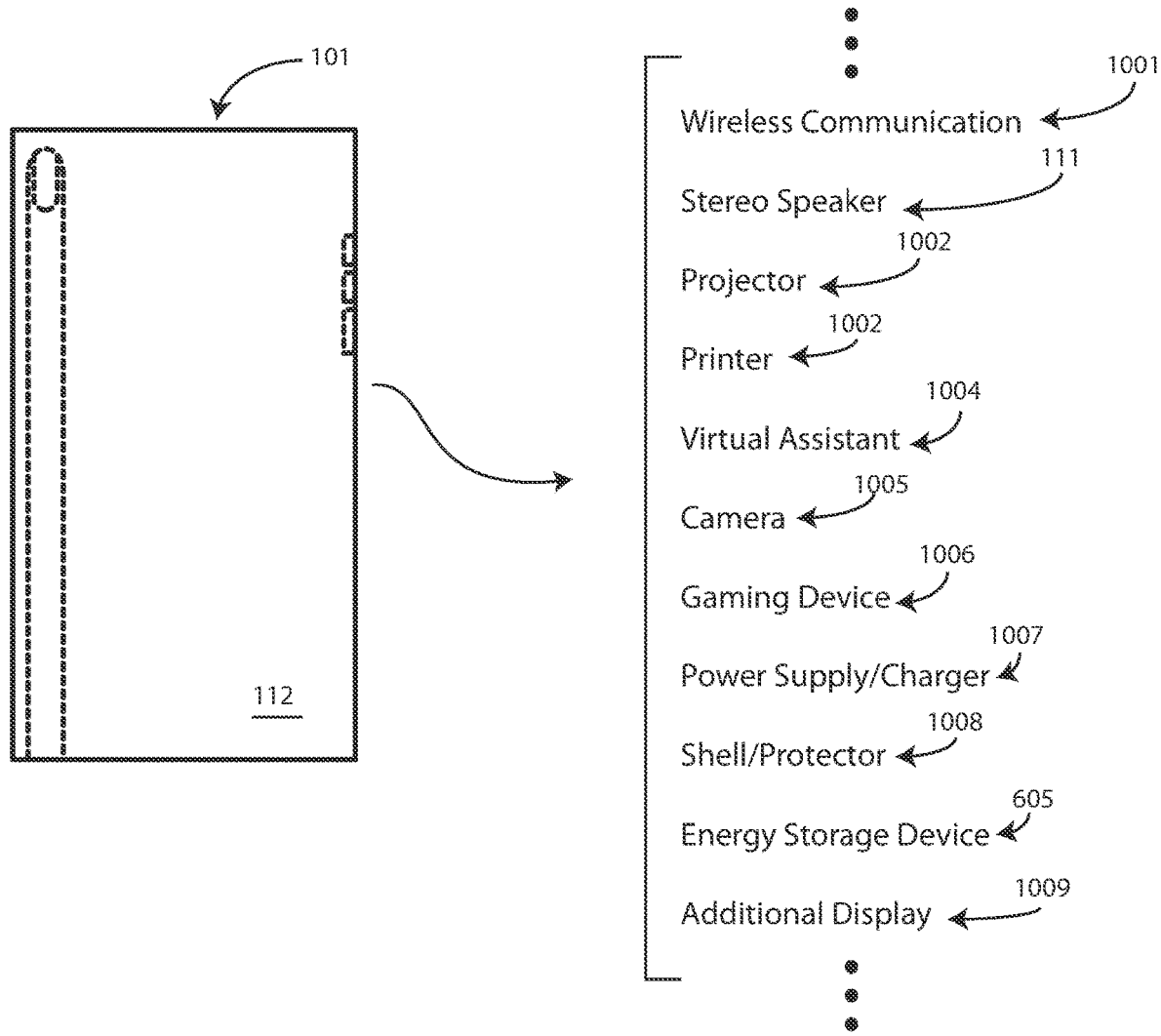
FIG. 10 illustrates various electronic device accessories in accordance with one or more embodiments of the disclosure.

The accessory components 608 can take various forms. In the illustrative embodiment of FIGS. 1-4 above, the accessory component 608 was a loudspeaker (111). However, embodiments of the disclosure are not so limited. Turning briefly now to FIG. 10, illustrated therein are various other accessory components and configurations the attachment 101 may take in accordance with embodiments of the disclosure.

In one or more embodiments, the accessory components (608) comprise wireless communication circuitry 1001. This allows the attachment 101 to provide increased or enhanced communication capabilities for the electronic device (100) to which it is attached. For instance, if the electronic device (100) is equipped with a communication circuit (504) configured for electrical communications in accordance with a first standard, and a new, faster, and better standard is adopted, attaching an attachment 101 with wireless communication circuitry configured to communicate at the new standard provides increased communication capabilities for the electronic device (100).

In one or more embodiments, the accessory components (608) comprise a loudspeaker 111, as previously described. In one or more embodiments, the loudspeaker 111 can be an enhanced loudspeaker compared to that of the electronic device (100) to which the attachment (101) is attached. Illustrating by example, if the electronic device (100) includes a mono aural loudspeaker, the loudspeaker 111 of the attachment may be a stereo speaker, and so forth.

In one or more embodiments, the accessory components (608) comprise a projector 1002. The projector 1002 can allow the electronic device (100) to project images on wall or other projection surface. Advantageously, coupling an attachment 101 having a projector 1002 as the accessory component (608) allows a user to project and stream movies, photos, and shows in one or more embodiments.

In one or more embodiments, the accessory components (608) comprise a printer 1003. The printer 1003 can be used to print photographs, documents, and other items captured by the electronic device (100) to which the attachment 101 is attached, or alternatively that are captured by the attachment 101 itself.

In one or more embodiments, the accessory components (608) comprise a virtual assistant 1004. The virtual assistant 1004 may include a voice activated set of processors and communication circuits that retrieve answers to questions received by one or more microphones of the attachment 101. The virtual assistant 1004 may be able to stream music or other information in response to voice requests from a user. Additionally, the virtual assistant 1004 may be able to manage calendars, to-do lists, and other applications as well.

In one or more embodiments, the accessory components (608) comprise an auxiliary camera 1005. While many electronic devices to which the attachment 101 is attached will include a primary camera, the auxiliary camera 1005 of the attachment 101 may include enhanced features. For example, while the primary camera of the electronic device (100) may have a limited field of view, the auxiliary camera 1005 may be a 360-degree camera, and so forth.

In one or more embodiments, the accessory components (608) comprise a gaming device 1006. The gaming device may include physical buttons and/or other controls to simulate a traditional video game or arcade game controller to provide a user with a more realistic gaming experience compared to using a touch-screen or other user input device to control gaming operations. The gaming device 1006 may include joysticks or other large mechanical controls that are not desirable to have on an electronic device (100) to which the attachment 101 is attached. Advantageously, when a user desires to engage in serious gaming, the user can attach the attachment 101 with the gaming device 1006 to the electronic device (100), removing it thereafter when the gaming is done.

In one or more embodiments, the accessory components (608) comprise a charger or power supply 1007, which can include an energy source 605 or storage device as well. An attachment 101 so equipped can serve as a power pack for the electronic device (100) to which it is attached, thereby enabling the electronic device (100) to have an increased run time compared with when the attachment 101 is detached from the electronic device (100).

In one or more embodiments, the accessory components (608) comprise a shell or protector device 1008. The shell or protector device 1008 can be configured as a folio that protects the electronic device (100) to which the attachment 101 is coupled from every day scratches and bumps. In one or more embodiments, the shell or protector device 1008 includes pockets to hold supplemental objects, such as money or credit cards. Where configured as a folio, the shell or protector device 1008 can include snaps or magnets to hold the folio closed when not in use. The shell or protector device 1008 can come in different colors and can be manufactured from different materials in one or more embodiments.

In one or more embodiments, the accessory components (608) comprise an additional display 1009. The incorporation of an additional display 1009 into the attachment 101 allows the usable display space of the electronic device (100) to which the attachment 101 is attached to be extended to form a larger overall effective display.

It should be noted that the list of accessory components (608) set forth in FIG. 10 is illustrative only. Numerous others will be obvious to those of ordinary skill in the art having the benefit of this disclosure.

Moreover, it should be noted that the accessory components (608) of FIG. 10 can be incorporated into the attachment 101 alone or in combination. Illustrating by example, in one or more embodiments the attachment 101 includes an additional display 1009 on the front major face 112 and a camera 1005 on the rear major face (212). Since the attachment 101 can be reversibly coupled to the monorail (117) of the electronic device (100), as illustrated and described in FIGS. 7-8 below, the system comprising the electronic device (100) and attachment 101 can be configured in different ways. One can couple the attachment 101 to the electronic device (100) in the first configuration such that the display (103) of the electronic device (100) and the additional display 1009 of the attachment 101 are arranged side-by-side. The one or more processors (501) of the electronic device (100) can then use this "second" display of the attachment 101 in unison with the display (103) of the electronic device (100) to create a larger overall display presentation area.

By contrast, when the attachment 101 is coupled to the electronic device in the second configuration, the camera 1005 of the attachment 101 is situated adjacent to the display (103) of the electronic device (100). This allows the person to take "selfies," engage in video conferences, and perform other operations with the camera 1005 that would not be possible if the camera 1005 were permanently situated on the rear face of the combined device. Advantageously, simply by "flipping" the accessory around, the person has the option of having an enlarged display at some times and a front-facing camera at others.

Figure 7:
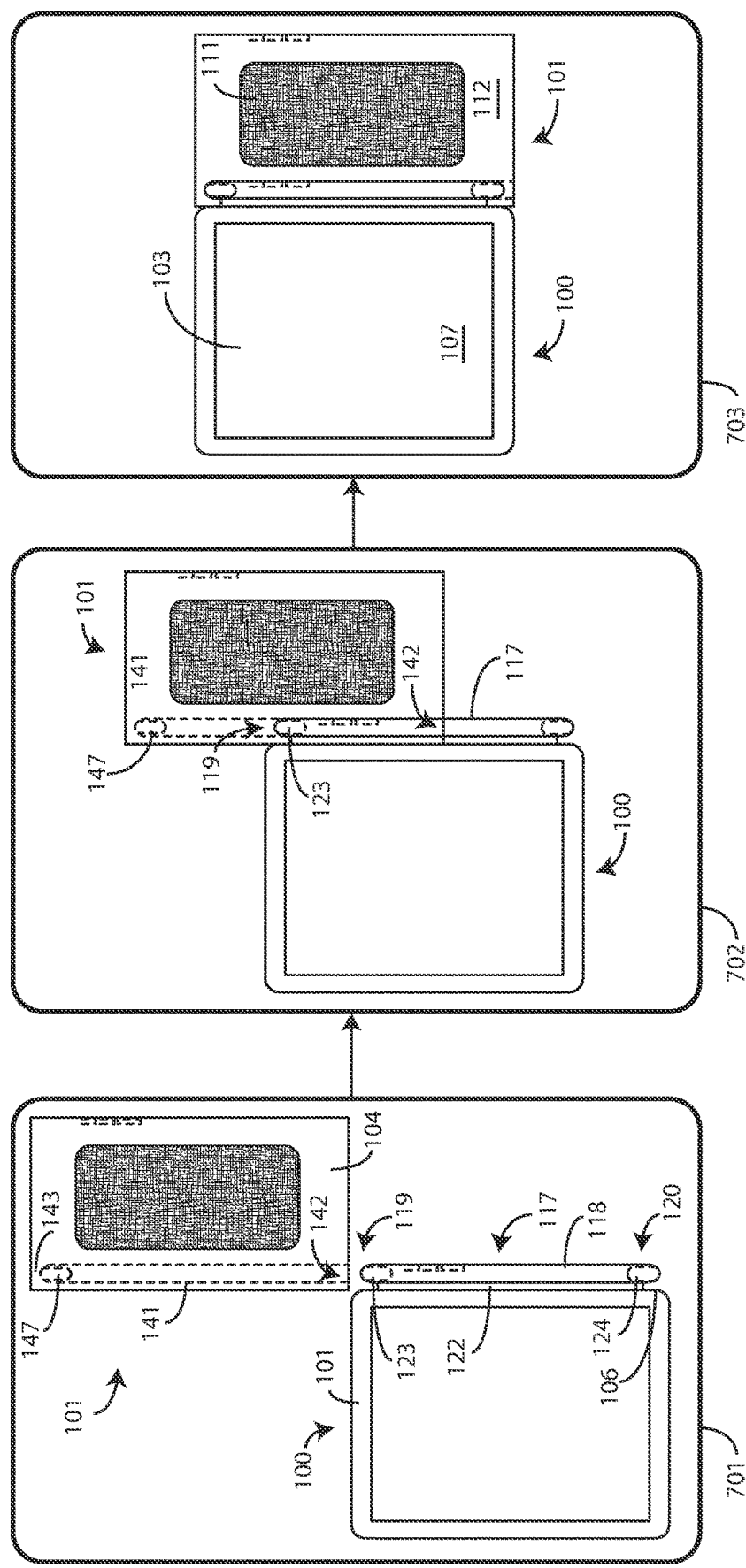
FIG. 7 illustrates one or more method steps and system devices in accordance with one or more embodiments of the disclosure.
Figure 8:
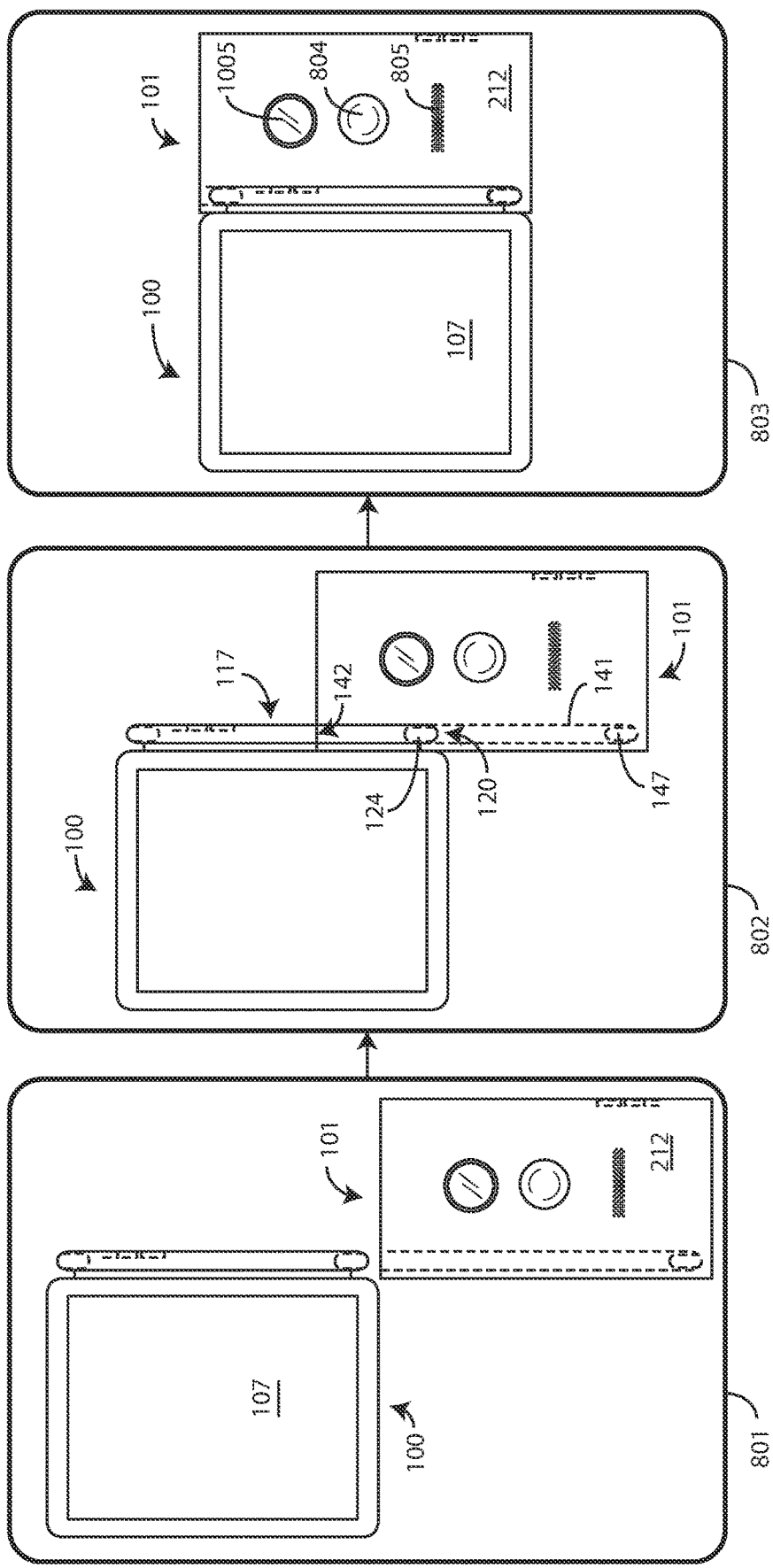
FIG. 8 illustrates one or more method steps and system devices in accordance with one or more embodiments of the disclosure.

Turning now to FIGS. 7-8, this "reversibility" offered by embodiments of the disclosure is described in more detail. Beginning with FIG. 7 at step 701 an electronic device 100 comprises a device housing 102 having a minor face 106 coupled to a monorail 117 by a bridge member 122. In this illustrative embodiment, the monorail 117 comprises monorail body 118 with a first electrical connector 123 positioned at a first end 119 of the monorail body 118 and a second electrical connector 124 positioned at a second end 120 of the monorail body 118. As previously described, in this embodiment the first electrical connector 123 and the second electrical connector 124 are of the same type, which in this example is that of a female universal serial bus type-C connector.

Step 701 also shows an attachment 101 comprising an attachment housing 104 defining a monorail receiver 141 having an aperture 142 at a first end of the monorail receiver 414 and a bounding wall 143 at a second end of the monorail receiver 141. A third electrical connector 147 is situated within the monorail receiver 141 at the bounding wall 143. In one or more embodiments, the third electrical connector 147 is complementary to the first electrical connector 123 and the second electrical connector 124. In this illustrative embodiment, the third electrical connector 147 comprises a male universal serial bus type-C connector.

Turning now to step 702, in one or more embodiments one attaches the attachment 101 to the electronic device 100 in a first configuration by inserting the first end 119 of the monorail 117 into the aperture 142 of the monorail receiver 141. One then slides the attachment 101 along the monorail 117 until the third electrical connector 147 couples to, and engages, the first electrical connector 123, as shown at step 703. In this first configuration, the front major face 107 of the electronic device 100 and the front major face 112 of the attachment 101 face in the same direction. In this illustrative embodiment, the front major face 112 of the attachment 101 includes a loudspeaker 111. Accordingly, the display 103 of the electronic device 100 and the loudspeaker 111 face in the same direction, which is out of the page as viewed in FIG. 7.

The attachment 101 can also be coupled to the electronic device 100 in a second configuration where the front major face 107 of the electronic device 100 and the front major face 112 of the attachment 101 face in opposite directions. How this occurs is shown in FIG. 8.

Turning now to FIG. 8, and beginning at step 801, the attachment 101 has been rotated 180 degrees such that the rear major face 212 of the attachment 101 faces out of the page, with the front major face (112) of the attachment 101 facing into the page. Accordingly, the front major face 107 of the electronic device 100 and the front major face (112) of the attachment 101 face in opposite directions.

Turning now to step 802, in one or more embodiments one attaches the attachment 101 to the electronic device 100 in the second configuration by inserting the second end 120 of the monorail 117 into the aperture 142 of the monorail receiver 141. One then slides the attachment 101 along the monorail 117 in the opposite direction from that shown in FIG. 7 at step 702 until the third electrical connector 147 couples to, and engages, the second electrical connector 124, as shown at step 803. In this second configuration, the front major face 107 of the electronic device 100 and the rear major face 212 of the attachment 101 face in the same direction, which results in the front major face 107 of the electronic device 100 and the front major face (112) of the attachment 101 facing in opposite directions. In this illustrative embodiment, the rear major face 212 of the attachment 101 includes a camera 1005, a control button 804, and a microphone 805. Accordingly, the display 103 of the electronic device 100 and the camera 1005 face in the same direction, which is out of the page as viewed in FIG. 8.

Figure 9:
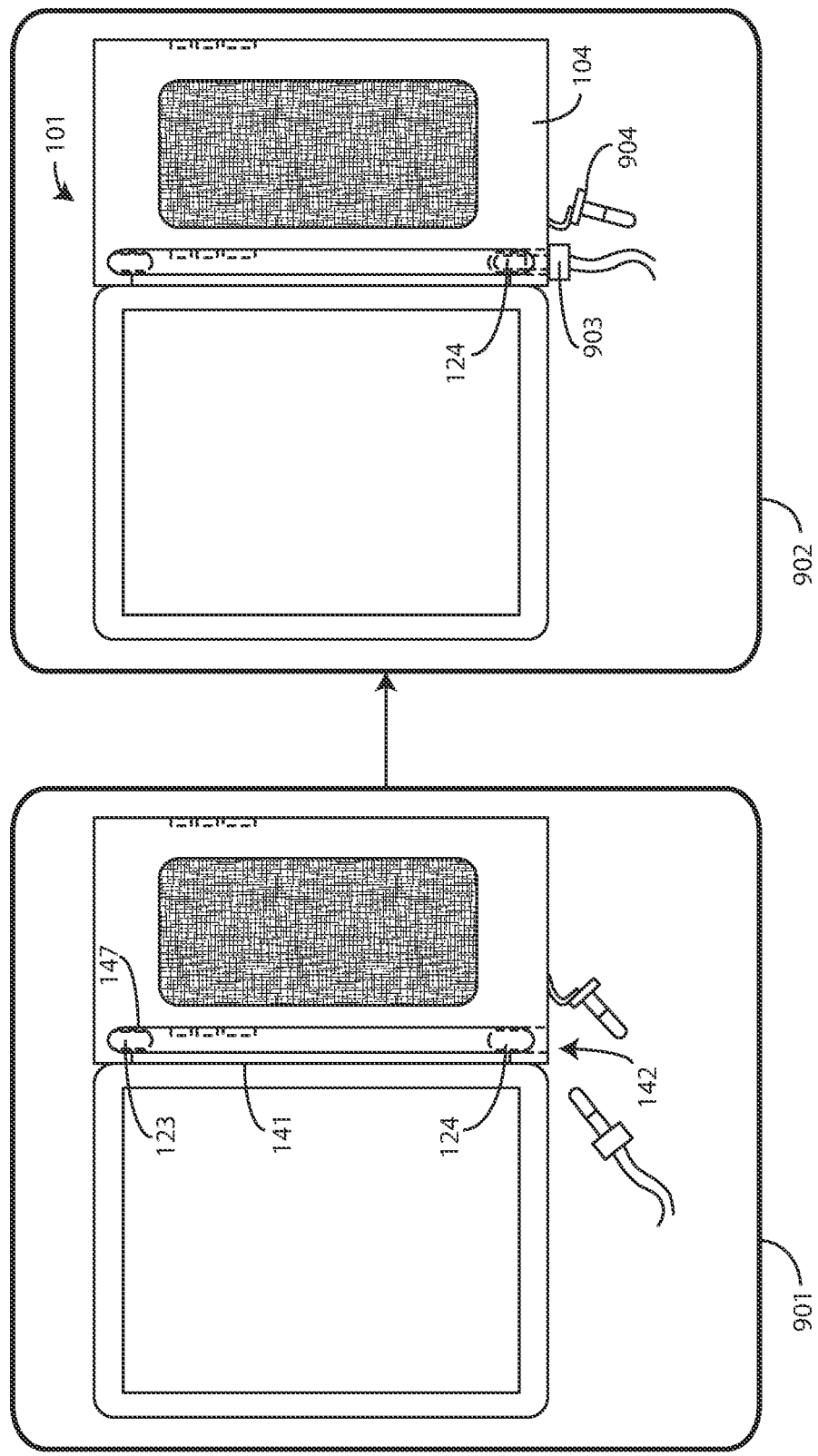
FIG. 9 illustrates one or more method steps and system devices in accordance with one or more embodiments of the disclosure.

Turning now to FIG. 9, in one or more embodiments where the third electrical connector 147 situated within the monorail receiver 141 is coupled to one of the first electrical connector 123 or the second electrical connector 124, the other of the first electrical connector 123 of the second electrical connector 124 remains exposed through the 142. For example, as shown at step 901 the third electrical connector 147 is coupled to one of the first electrical connector 123, thereby leaving the second electrical connector 124 exposed through the aperture 142 of the monorail receiver 141. This advantageously allows for another device to be electrically coupled to the system by way of the second electrical connector 124.

Illustrating by example, as shown at step 902 an electrical connector 903 from another electronic device, which may be a video device, an audio device, a data storage device, an energy delivery device, a network connectivity device, or other device, is electrically coupled to the second electrical connector 124. Alternatively, where a user desires to cover the second electrical connector 124 rather than coupling the second electrical connector 124 to another device, an optional cap or cover 904 can be inserted into the second electrical connector 124 to prevent debris, moisture, or other objects from entering the second electrical connector. In one or more embodiments, the optional cap or cover 904 is tethered to the attachment housing 104 of the attachment 101 so it will not be lost when not in use.

Figure 11:
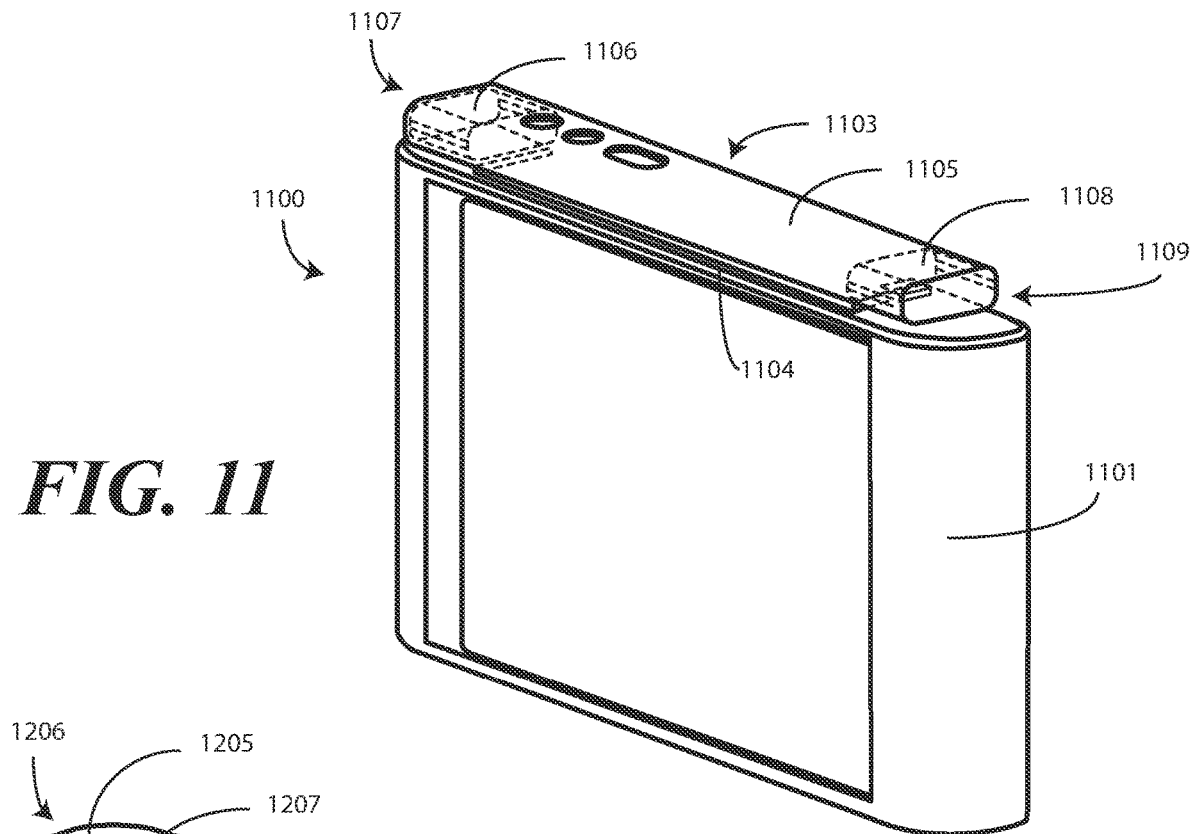
FIG. 11 illustrates one explanatory electronic device in accordance with one or more embodiments of the disclosure.

Turning now to FIG. 11, illustrated therein is another electronic device 1100 configured in accordance with one or more embodiments of the disclosure. In one or more embodiments, the electronic device 1100 includes a device housing 1101. In one or more embodiments, the device housing 1101 includes a minor face 1102 coupled to a monorail 1103 by a bridge member 1104. In this illustrative embodiment, the monorail 1103 comprises a monorail body 1105 having a first electrical connector 1106 positioned at a first end 1107 of the monorail body 1105. In this illustrative embodiment, a second electrical connector 1108 is positioned at a second end 1109 of the monorail body 1105. In one or more embodiments, the first electrical connector 1106 and the second electrical connector 1108 are the same type of connector.

Figure 12:
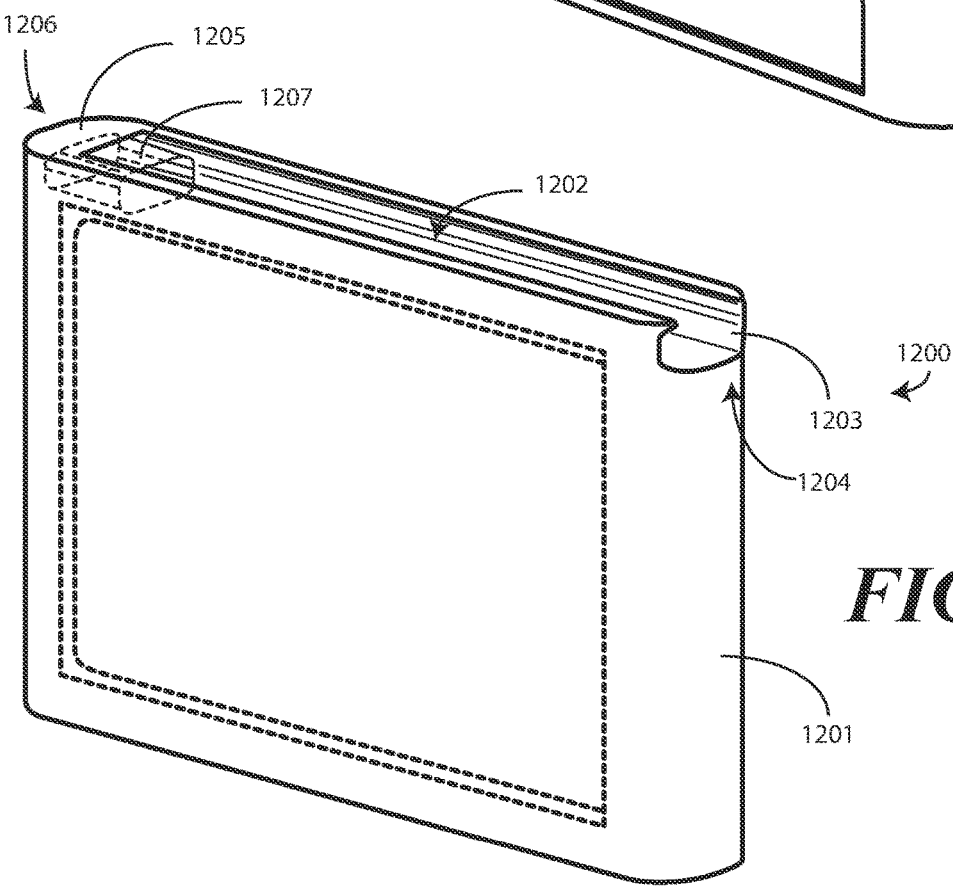
FIG. 12 illustrates one explanatory electronic device attachment in accordance with one or more embodiments of the disclosure.

Turning now to FIG. 12, illustrated therein is an electronic device attachment 1200 configured in accordance with one or more embodiments of the disclosure. In one or more embodiments, the electronic device attachment 1200 comprises an attachment housing 1201. In one or more embodiments, the attachment housing 1201 defines a monorail receiver 1202 having an aperture 1203 positioned at a first end 1204 of the monorail receiver 1202. In one or more embodiments, the monorail receiver 1202 includes a bounding wall 1205 positioned at a second end 1206 of the monorail receiver 1202.

In one or more embodiments, a third electrical connector 1207 is situated within the monorail receiver 1202 at the bounding wall 1205. In one or more embodiments, the third electrical connector 1207 is complementary to the first electrical connector (1106) and the second electrical connector (1108) described above with reference to FIG. 11.

Figure 13:
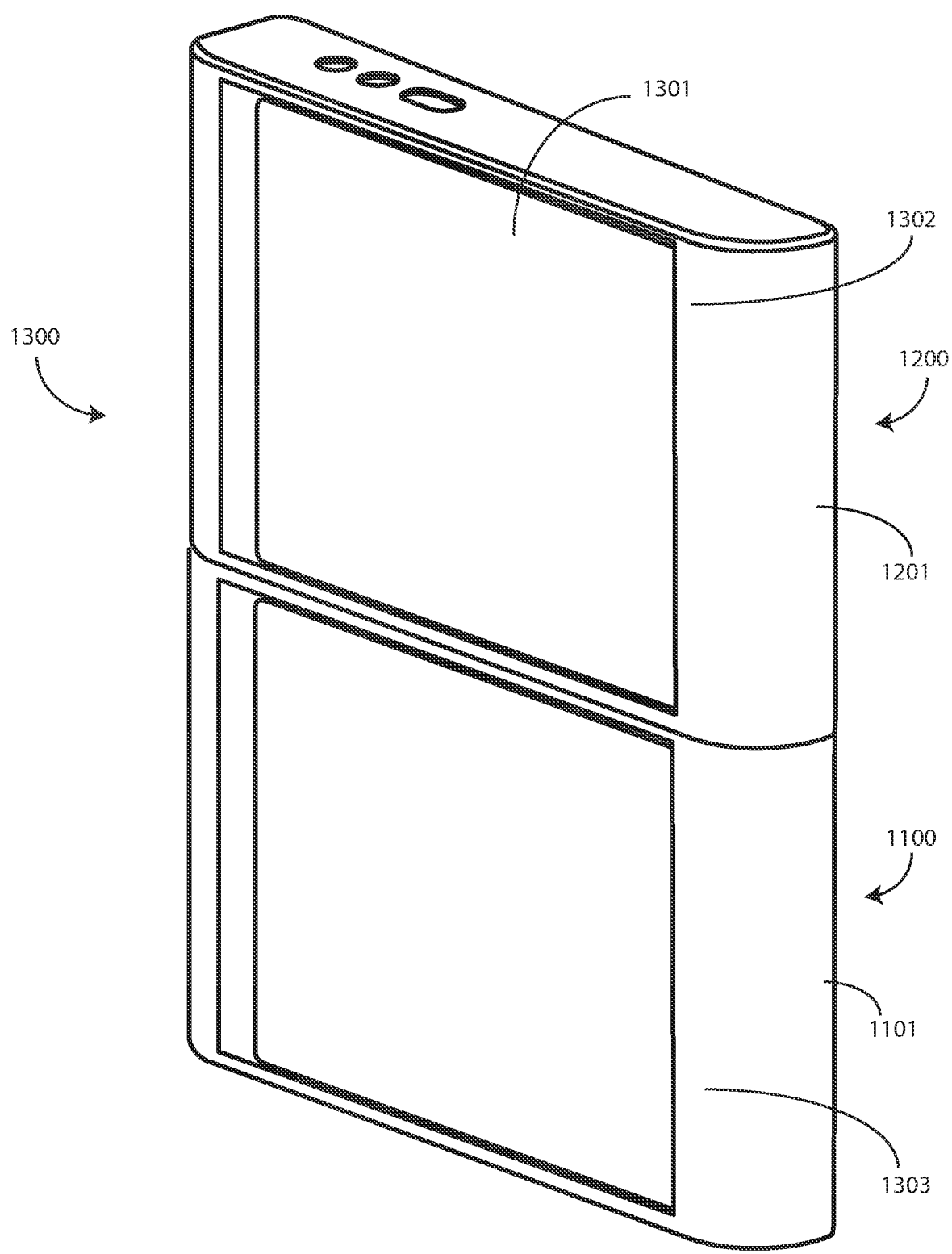
FIG. 13 illustrates one explanatory electronic device coupled to one explanatory electronic device attachment in a first configuration in accordance with one or more embodiments of the disclosure.

Turning now to FIG. 13, the electronic device 1100 of FIG. 11 has been coupled to the electronic device attachment 1200 of FIG. 12 in a first configuration 1300 in accordance with the method described above with reference to FIG. 7. In this illustrative embodiment, the third electrical connector (1207) of the electronic device attachment 1200 is coupled to the first electrical connector (1106) of the electronic device 1100. In this illustrative embodiment, the attachment housing 1201 comprises a display 1301 coupled to the front major face 1302 of the attachment housing 1201. Accordingly, in this first configuration 1300, the front major face 1302 of the attachment housing 1201 and the front major face 1303 of the device housing 1101 face the same direction, which is to the left and out of the page as viewed in FIG. 13.

Figure 14:
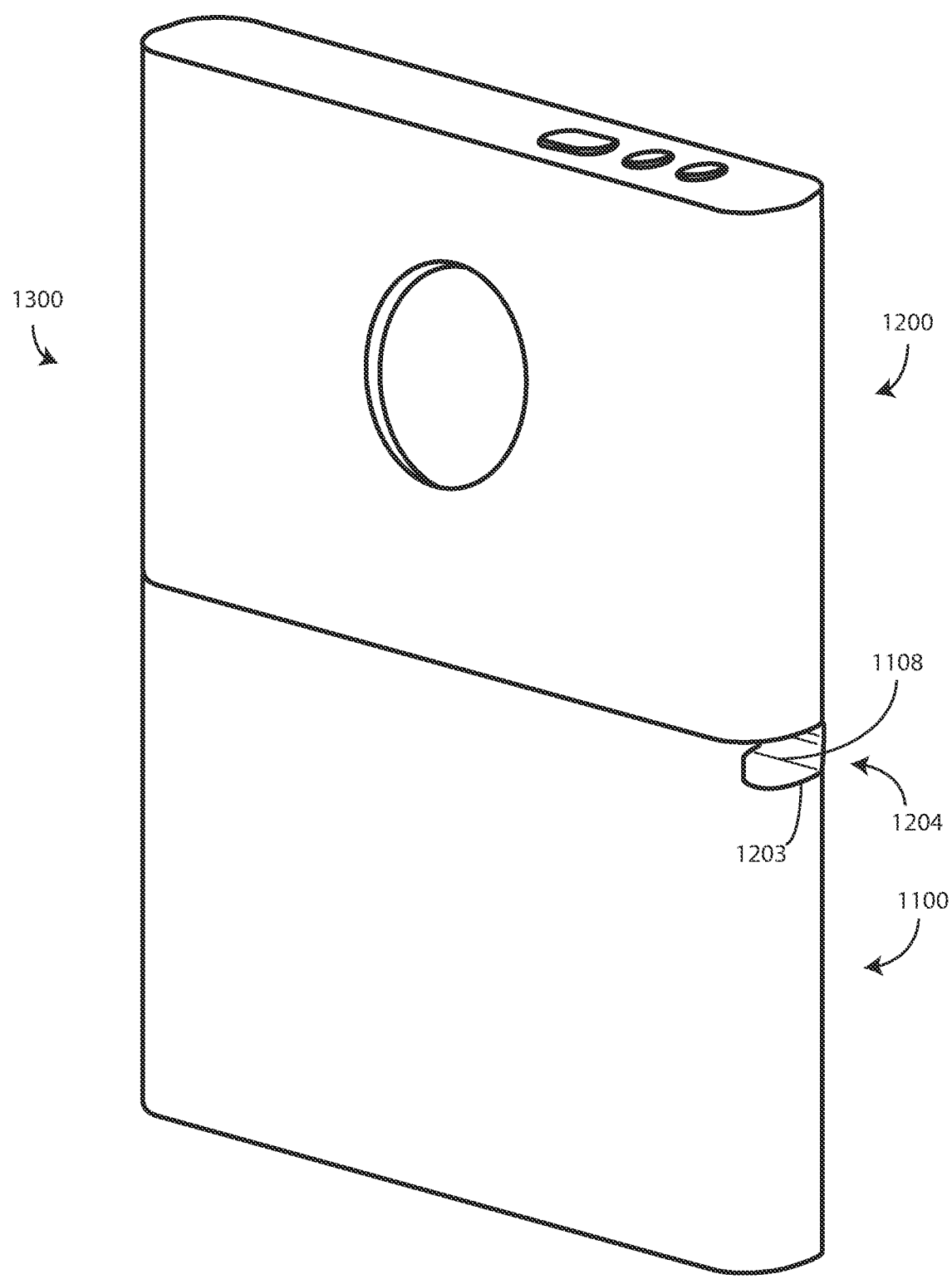
FIG. 14 illustrates one explanatory electronic device coupled to one explanatory electronic device attachment in a first configuration in accordance with one or more embodiments of the disclosure.

Turning now to FIG. 14, in the first configuration 1300 the second electrical connector 1108 is exposed through the aperture 1203 at the first end 1204 of the monorail receiver 1202 in this first configuration 1300. This allows additional devices to be coupled to the second electrical connector 1108. Alternatively, a cap or plug can be inserted into the aperture 1203 to cover the second electrical connector 1108.

Figure 15:
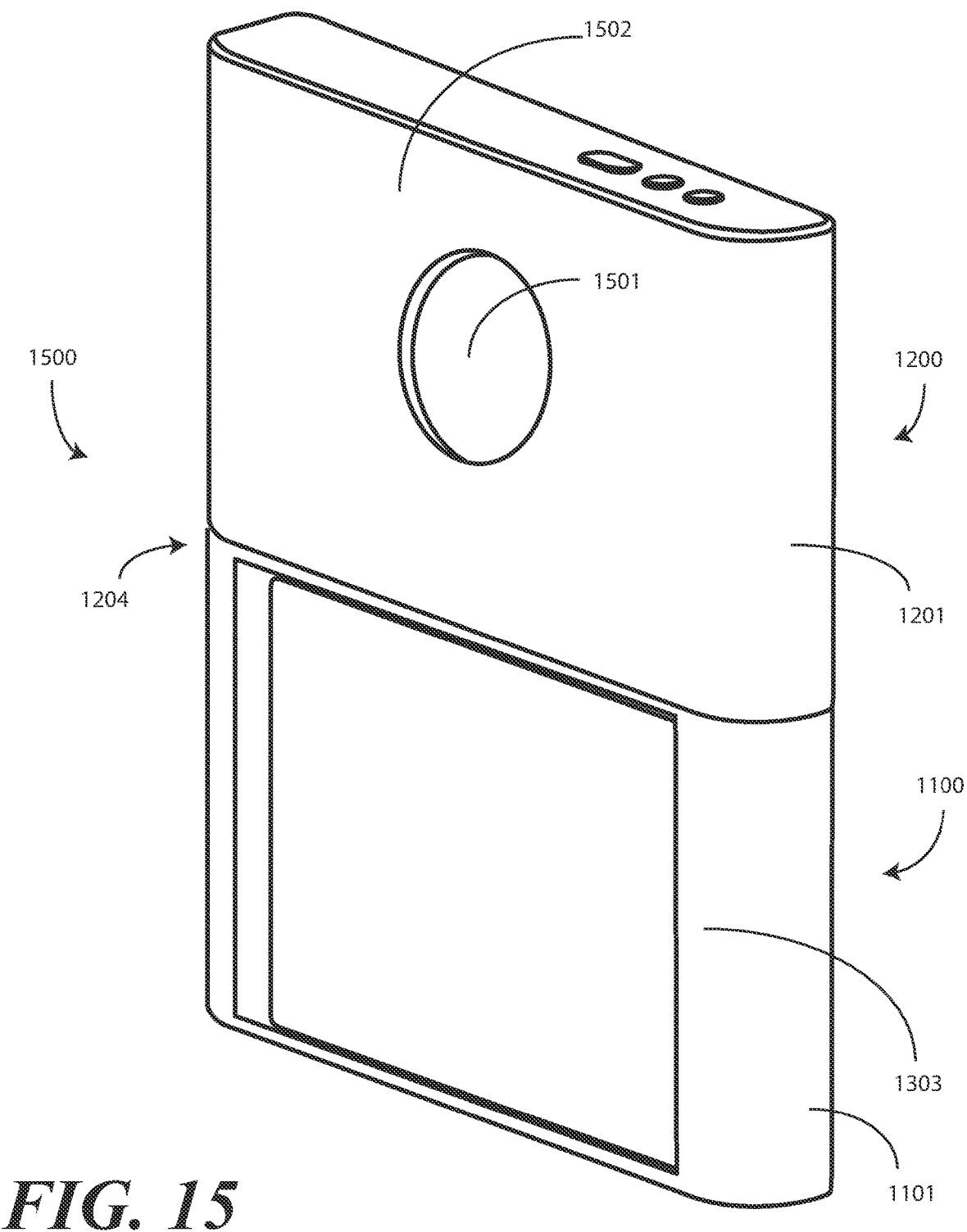
FIG. 15 illustrates one explanatory electronic device coupled to one explanatory electronic device attachment in a second configuration in accordance with one or more embodiments of the disclosure.

Turning now to FIG. 15, the electronic device 1100 of FIG. 11 has been coupled to the electronic device attachment 1200 of FIG. 12 in a second configuration 1500 in accordance with the method described above with reference to FIG. 8. Specifically, the electronic device attachment 1200 has been rotated 180 degrees. In this illustrative embodiment, the third electrical connector (1207) of the electronic device attachment 1200 is coupled to the second electrical connector (1108) of the electronic device 1100.

In this illustrative embodiment, the attachment housing 1201 comprises an imager 1501 coupled to the rear major face 1502 of the attachment housing 1201. Accordingly, in this second configuration 1500, the rear major face 1502 of the attachment housing 1201 and the front major face 1303 of the device housing 1101 face the same direction, which is to the left and out of the page as viewed in FIG. 15. While the aperture (1203) and second electrical connector (1108) are hidden in FIG. 15, the first electrical connector (1106) is exposed through the aperture (1203) at the first end 1204 of the monorail receiver (1202) in this second configuration 1500, just as the second electrical connector (1108) was exposed through the aperture (1203) at the first end 1204 of the monorail receiver (1202) in FIG. 13 above.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Figure 16:
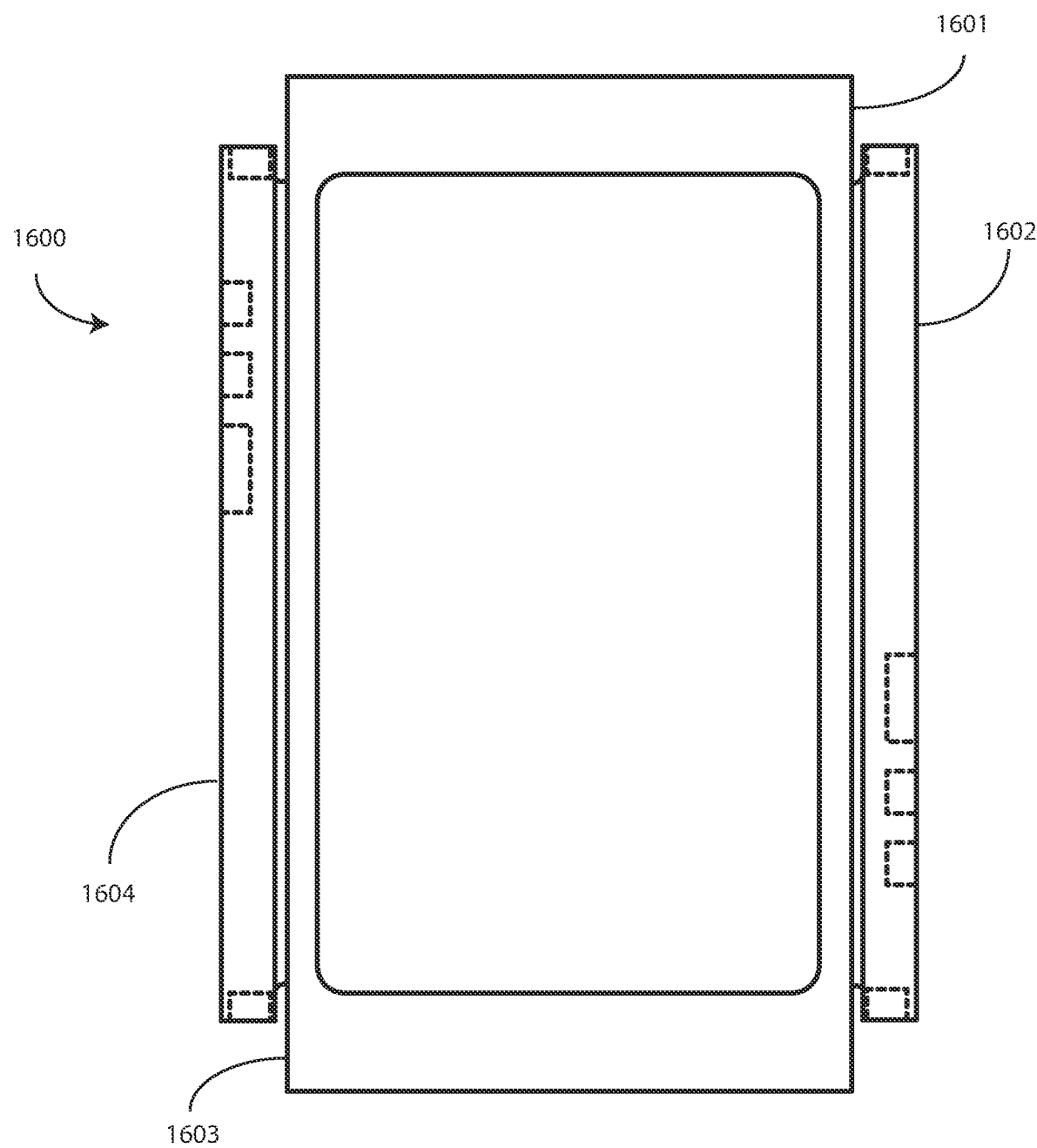
FIG. 16 illustrates another explanatory electronic device in accordance with one or more embodiments of the disclosure.

For example, the embodiments of FIGS. 1-14 included an electronic device that had a single monorail coupled to a single minor face. However, embodiments of the disclosure are not so limited. As shown in FIG. 16, an electronic device 1600 can include a first minor face 1601 coupled to a first monorail 1602 by a bridge member, while a second minor face 1603 can be coupled to a second monorail 1604. Each of the first monorail 1602 and the second monorail 1604 can include a monorail body with a first electrical connector positioned at a first end of the monorail body and a second electrical connector positioned at a second end of the monorail body, as previously described. Moreover, each of the electrical connectors can be of the same type.

Accordingly, as shown in FIG. 16 the electronic device 1600 comprises a housing member defining at least one major face and one or more minor faces, which are shown as a first minor face 1601 and a second minor face 1603. As shown, a first monorail 1602 comprises a monorail body defining a first end and a second end separated from the first end along a major axis of the monorail body. A bridge member mechanically couples the first monorail 1602 to the first minor face 1601 of the housing member. A first electrical connector is positioned at the first end of the monorail body, while a second electrical connector is positioned at the second end of the monorail body. In this illustrative embodiment, the first electrical connector and the second electrical connector are of the same type.

As also shown in FIG. 16, the electronic device 1600 includes another monorail, here the second monorail 1603. The second monorail 1603 comprises another monorail body defining another first end and another second end separated from the another first end by the second monorail body. There is another bridge member mechanically coupling the second monorail 1603 to second minor face 1603 of the housing member. A third electrical connector is positioned at the first end of the second monorail body, while a fourth electrical connector is positioned at the second end of the second monorail body. In this illustrative embodiment, the third electrical connector and the second fourth connector are of the same type.

Figure 17:
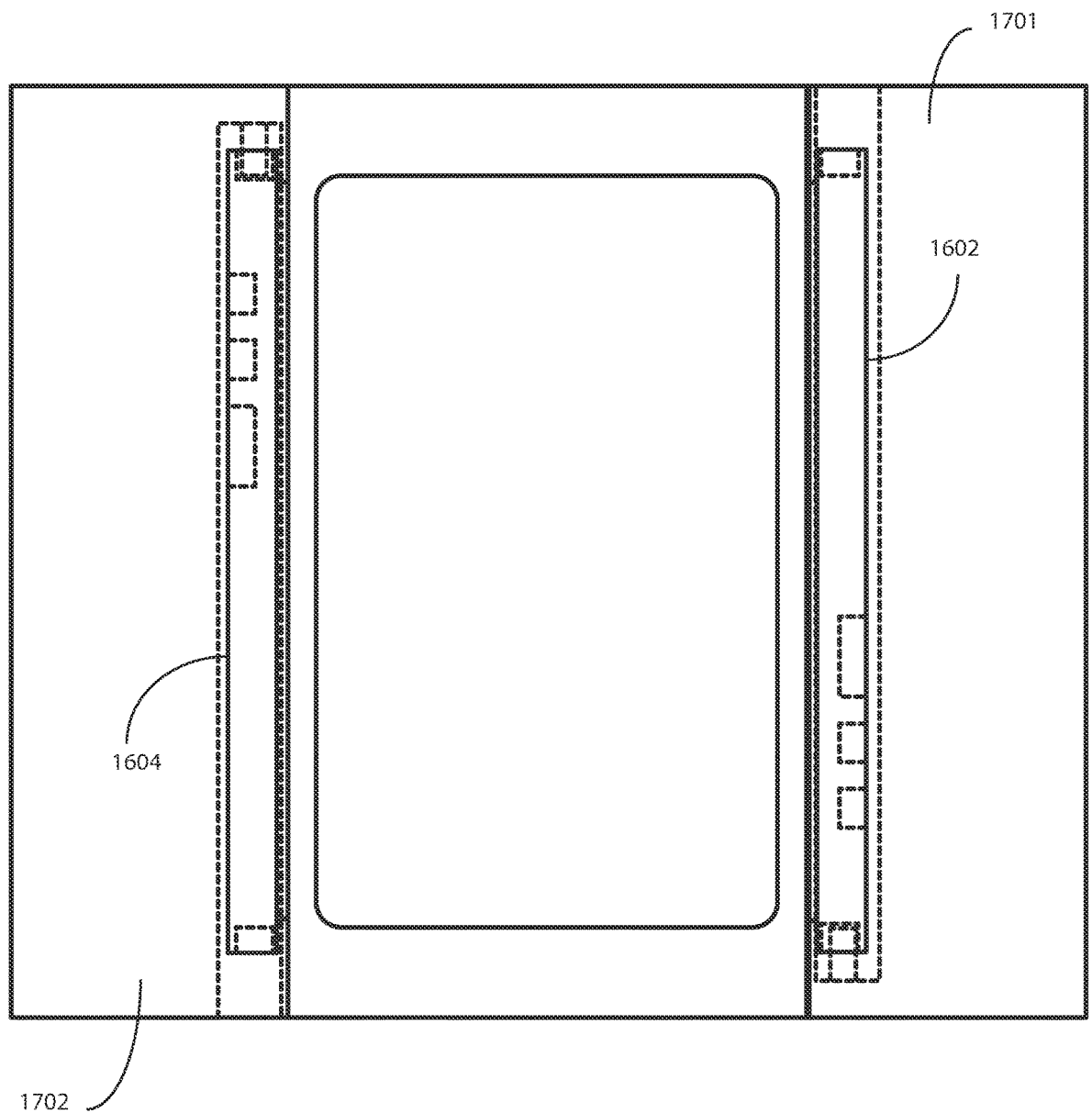
FIG. 17 illustrates another explanatory system devices in accordance with one or more embodiments of the disclosure.
Figure 18:
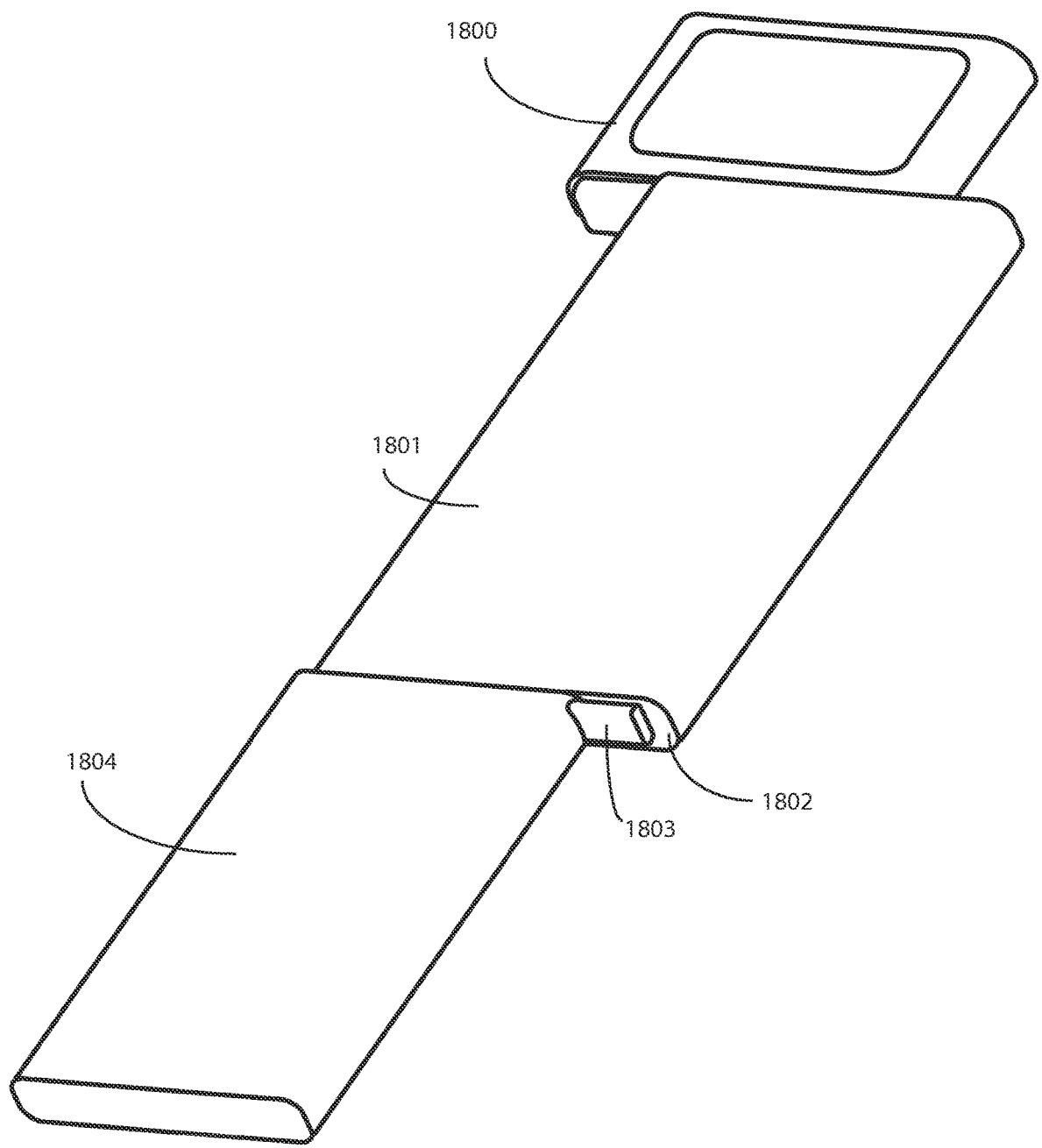
FIG. 18 illustrates another explanatory system in accordance with one or more embodiments of the disclosure.

As shown in FIG. 17, this configuration allows a first attachment 1701 to be coupled to the first monorail 1602, while a second attachment 1702 is coupled to the second monorail 1604. Moreover, as shown in FIG. 18, an attachment 1801 can be equipped with a minor face 1802 coupled to a monorail 1803 by a bridge member. Accordingly, an electronic device 1800 and two or more attachments 1801, 1804 can be coupled in a daisy-chain configuration. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:
1. An electronic device, comprising:
   a device housing defining at least one major face and one or more minor faces;
   a monorail mechanically coupled to a minor face of the device housing, the monorail comprising a monorail body defining a first end and a second end separated from the first end along a major axis of the monorail body;

a first electrical connector positioned at the first end of the monorail body; and a second electrical connector positioned at the second end of the monorail body;

wherein the first electrical connector and the second electrical connector are of the same type;

the monorail body having a monorail body length along the major axis of the monorail body that is less than another length of a minor face of the device housing to which the monorail is coupled.

2. The electronic device of claim 1, the first electrical connector and the second electrical connector being concentrically aligned with the major axis of the monorail body.

3. The electronic device of claim 1, the first electrical connector configured to receive a first complementary connector from a first direction along the major axis of the monorail body, the second electrical connector configured to receive a second complementary connector from a second direction along the major axis of the monorail body, wherein the first direction is opposite the second direction.

4. The electronic device of claim 1, further comprising one or more user input devices positioned along an exterior of the monorail body.

5. The electronic device of claim 1, further comprising a bridge member mechanically coupled between the monorail and the device housing.

6. The electronic device of claim 5, the bridge member having a bridge member cross sectional area that is less than a monorail body cross sectional area of the monorail body and a bridge member length that is less than the monorail body length.

7. The electronic device of claim 1, wherein a perimeter of the monorail body defines a first linear side and a second linear side.

8. The electronic device of claim 7, the perimeter of the monorail body further defining a first partially circular side and a second partially circular side positioned between the first linear side and the second linear side.

9. The electronic device of claim 7, the first electrical connector and the second electrical connector each defining female universal serial bus type type-C connectors.

10. The electronic device of claim 7, further comprising one or more processors situated within the device housing, wherein the first electrical connector and the second electrical connector are electrically coupled to the one or more processors.

11. The electronic device of claim 10, further comprising one or more user input devices positioned along one of the first linear side or the second linear side of the perimeter of the monorail body, wherein the one or more user input devices are electrically coupled to the one or more processors.

12. The electronic device of claim 1, further comprising an attachment retention device mechanically coupled to the monorail body.

13. The electronic device of claim 1, further comprising:
another monorail mechanically coupled to the device housing, the another monorail comprising another monorail body defining another first end and another second end separated from the another first end by the another monorail body;

a third electrical connector positioned at the another first end of the another monorail body; and a fourth electrical connector positioned at the another second end of the another monorail body;

wherein the third electrical connector and the fourth electrical connector are of the same type.

14. A system comprising:
an electronic device comprising a device housing having a minor face coupled to a monorail by a bridge member, the monorail comprising a monorail body with a first electrical connector positioned at a first end of the monorail body and a second electrical connector positioned at a second end of the monorail body; and an electronic device attachment comprising an attachment housing defining a monorail receiver having an aperture at a first end of the monorail receiver and a bounding wall at a second end of the monorail receiver, and a third electrical connector situated within the monorail receiver at the bounding wall, wherein the third electrical connector is complementary to the first electrical connector and the second electrical connector.

15. The system of claim 14, wherein when the third electrical connector is coupled to the first electrical connector, a first major face of the attachment housing and a first major face of the device housing face the same direction, and the second electrical connector is exposed through the aperture at the first end of the monorail receiver.

16. The system of claim 15, wherein when the third electrical connector is coupled to the second electrical connector, the first major face of the attachment housing and the first major face of the device housing face opposite directions, and the first electrical connector is exposed through the aperture at the first end of the monorail receiver.

17. The system of claim 16, the attachment housing comprising a display coupled to the first major face of the attachment housing and an imager coupled to a second major face of the attachment housing.

18. An electronic device, comprising:
a device housing defining at least one major face and one or more minor faces;

a monorail mechanically coupled to a minor face of the device housing, the monorail comprising a monorail body defining a first end and a second end separated from the first end along a major axis of the monorail body;

a first electrical connector positioned at the first end of the monorail body; and a second electrical connector positioned at the second end of the monorail body;

wherein the first electrical connector and the second electrical connector are of the same type;

wherein a perimeter of the monorail body defines a first linear side and a second linear side.

19. The electronic device of claim 18, the perimeter of the monorail body further defining a first partially circular side and a second partially circular side positioned between the first linear side and the second linear side.

20. The electronic device of claim 18, the first electrical connector and the second electrical connector each defining female universal serial bus type type-C connectors.

* * * * *